United States Patent [19]

Oguchi

[11] Patent Number: 5,646,392
[45] Date of Patent: Jul. 8, 1997

[54] CARD READER

[75] Inventor: Katsuaki Oguchi, Nagano, Japan

[73] Assignee: Sankyo Seiki Mfg. Co., Ltd., Nagano-ken, Japan

[21] Appl. No.: 489,343

[22] Filed: Jun. 12, 1995

[30] Foreign Application Priority Data

| Jun. 13, 1994 | [JP] | Japan | 6-130462 |
| Jun. 13, 1994 | [JP] | Japan | 6-130463 |
| Jun. 15, 1994 | [JP] | Japan | 6-132821 |

[51] Int. Cl.$^6$ .................................................. G06F 17/00
[52] U.S. Cl. ........................ 235/475; 235/477; 235/479
[58] Field of Search ............................ 235/475, 477, 235/479

[56] References Cited

U.S. PATENT DOCUMENTS

| 4,122,998 | 10/1978 | Eitzen | 235/475 |
| 4,377,828 | 3/1983 | Hayman et al. | 235/475 |
| 4,871,905 | 10/1989 | Mita | 235/475 |
| 5,179,504 | 1/1993 | Kitahara | 235/475 |
| 5,360,969 | 11/1994 | Suzuki | 235/475 |
| 5,438,186 | 8/1995 | Nair | 235/475 |
| 5,466,914 | 11/1995 | Kitahara | 235/475 |

*Primary Examiner*—Harold Pitts
*Attorney, Agent, or Firm*—McAulay Fisher Nissen Goldberg & Kiel, LLP

[57] ABSTRACT

A card reader includes a pad-roller supporting mechanism having a pad roller block for supporting a plurality of pad rollers for transporting a card inserted into a card traveling passage in cooperation with a plurality of drive rollers supported by a main-body block. The pad roller block is pivotally supported by the main-body block about pivotal shafts provided in parallel with the card traveling passage so as to be openable and capable of causing each of the pad rollers to come into contact with and move away from each of the drive rollers. A spring member is disposed on the main-body block and a pressing plate supported by the pad roller block and the spring member between an operating region and a nonoperating region of the spring member so as to be capable of being engaged with or disengaged from the pad roller block and the spring member, for imparting to the pad roller block a rotating urging force in a direction in which the pad rollers approaches the drive rollers.

9 Claims, 15 Drawing Sheets

CARD READER

BACKGROUND OF THE INVENTION

1. Field of the Invention

The present invention relates to a card reader for processing magnetic information recorded in a magnetic card.

2. Related Art

In a card reader which is a card processing apparatus for recording and reproducing magnetic information with respect to a magnetic card by means of a magnetic head, the card which is inserted into a card traveling passage is nipped by pairs of transport rollers which are each composed of a drive roller and a driven roller. At least one of the rollers is urged relative to the other roller for nipping the card with a fixed pressure. In a case where, for instance, the drive roller is located below the card traveling passage, the driven roller is supported by a support above the card traveling passage, the support being openable with respect to the passage. A torsion coil spring is wound around a rotating shaft of the support so as to urge the support in the closing direction, thereby pressing and urging the driven rollers against the drive rollers.

However, in the case where the torsion coil spring is wound around the rotating shaft of the support to press and urge the driven rollers against the drive rollers, the support cannot be rotated in the opening direction unless the torsion coil spring is removed from the rotating shaft and the action of the spring force is canceled. Hence, there is a drawback in operating efficiency at the time of assembly and maintenance.

Further, the card reader which is capable of coping with various types of cards, such as IC cards and magnetic cards, the recording and reproduction of information with respect to the magnetic card and the IC card is effected by means of the magnetic head and an IC card contact, respectively. The IC card contact is provided further to the interior of the magnetic head along the card passage because of the limited space of the apparatus.

In recent years, to prevent the unauthorized use of cards, the card reader is, in some cases, provided with a sensor called a security sensor for determining the acceptability of the card. However, this sensor must be provided at a position where the sensor does not overlap with the magnetic head, so that in the present situation the sensor is provided along the card passage at a position closer to the card-insertion side than the magnetic head.

If the magnetic head and the IC card contact for processing the card and/or the security sensor or the like are arranged along the inserting direction of the card in accordance with their functions, the following drawbacks are conceivably encountered.

For instance, in a pass-through type card reader in which the IC card is discharged to a side opposite to the insertion port, the drive roller must be provided further to the interior of the IC card contact so as to discharge the card processed by the IC card contact. As a result, there is a drawback in that the card passage becomes long, resulting in a large-size card reader.

In addition, in a case where a security sensor is provided in a reciprocating-type card reader in which the processed card is returned to the insertion port so as to be discharged, since in the present situation the security sensor is provided at a position closer to the card—insertion side than the magnetic head, the card passage becomes long, resulting in a large-size card reader.

Still further, in regard to the card reader for processing magnetic cards, such as credit cards and prepaid cards, the magnetic card is inserted into the card passage, and the processing of magnetic recording of the card is carried out by the magnetic head disposed in the passage. The card for which processing has been completed is discharged from the innermost end of the card passage or is returned to the card insertion port so as to be discharged from inside the apparatus.

The card can become curved or deformed depending on its management condition, and if such a card is inserted into the card passage, a state called "card jam" can possibly occur in which the card is jammed in the card passage.

SUMMARY OF THE INVENTION

An object of the present invention is to provide a card reader for processing magnetic information recorded in a magnetic card.

According to an aspect of the present invention, there is provided a card reader comprising: a pad-roller supporting mechanism including: a pad roller block for supporting a plurality of pad rollers for transporting a card inserted into a card traveling passage in cooperation with a plurality of drive rollers supported by a main-body block; the pad roller block is pivotally supported by the main-body block about pivotal shafts provided in parallel with the card traveling passage so as to be openable so as to be capable of causing each of the pad rollers to come into contact with and move away from each of the drive rollers; a spring member disposed on the main-body block; and a pressing plate supported by the pad roller block and the spring member between an operating region and a nonoperating region of the spring member so as to be capable of being engaged with or disengaged from the pad roller block and the spring member, so as to impart to the pad roller block a rotating urging force in a direction in which the pad rollers approaches the drive rollers.

According to another aspect of the present invention, there is provided a card reader comprising: a plurality of transport rollers provided so as to project slightly into the card traveling passage which is formed so as to extend from a card insertion port in a card-advancing direction, in order to transport the card inserted into the card traveling passage; an IC contact disposed between a first pair of transport rollers provided in a vicinity of the card traveling passage and a second pair of transport rollers disposed next to the first pair of transport rollers among the three pairs of transport rollers; a magnetic head for recording and reproducing magnetic information with respect to the card; and a shutter disposed between the card traveling passage and the first pair of transport rollers and capable of moving into and away from the card traveling passage.

According to yet another aspect of the present invention, there is provided a card reader comprising: a card ejecting mechanism including: a drive gear secured to the drive shaft; a clutch gear provided on a support shaft supported slidably by a base portion of the card reader so as to mesh with the drive gear; an ejecting gear provided on a pivotal shaft supported by the base portion of the card reader; driving means for displacing and moving the clutch gear in a direction in which the clutch gear meshes with the ejecting gear; and an ejecting member provided on the pivotal shaft and adapted to be introduced into the card traveling passage by intermeshing with the clutch gear and the ejecting gear with each other.

According to the present invention, since the urging force acting on the pad roller block in the closing direction can be canceled by displacing the pressing plate between the operating region and the nonoperating region of the spring member, the opening and closing operation of the pad roller block can be effected easily. Hence, the assembling operation and the maintenance operation can be carried out efficiently. This leads to a reduction in the manufacturing cost of the card reader.

According to the present invention, even if the engagement between the pressing plate and the pad roller block is canceled, the pressing plate is held in the L-shaped guide grooves by virtue of the engagement of its projections and the L-shaped guide grooves. Therefore, it is possible to reduce the number of cases where the pressing plate becomes lost, and to improve the operational efficiency at the time when the pressing plate is again engaged with the pad roller block.

According to the present invention, since the pivotal shafts of the pad roller block are provided on the outer side of the card traveling reference plane, the pad roller block can be removed completely from above the card traveling passage when the block is opened. Hence, the maintenance operation and the like can be carried out efficiently.

According to the present invention, since the IC contact is disposed between the first pair of transport rollers and the second pair of transport rollers, the card traveling passage can be shortened, so that the card reader can be made compact.

According to the present invention, since the rollers located above the card traveling passage and the IC contact are supported by the support disposed on the traveling reference plane side of the card traveling passage, a space can be formed above the card traveling passage at a position located on the side opposing the pad roller block, so that it is possible to dispose the security sensor and the like in this space. Hence, the card traveling passage can be shortened, and the card reader can be made compact.

According to the present invention, since the magnetic head is disposed above the axis of the drive roller constituting one of the rollers of the second pair of transport rollers, card processing can be effected by the magnetic head after the card-transporting speed has become stable. Hence, it is possible to reduce cases of faulty recording and reproduction of magnetic information.

According to the present invention, since the interval between the second pair of transport rollers and the shutter is set to be longer than the length of the card, and the interval between the first pair of transport rollers and the card insertion port is set to be shorter than the length of the card by 30 mm or more, when the card projects by at least 30 mm or more from the card traveling passage, the card is not subjected to feeding action of the first pair of transport rollers. In addition, the card can be held between the shutter and the second pair of transport rollers. Accordingly, it is possible to obtain a card reader which permits reliable withdrawal and insertion of the card, and facilitates its use.

In accordance with the present invention, since the ejecting gear for driving the ejecting member is coupled by the clutch gear to the drive gear which is driven by the drive motor, the ejecting gear can be driven by the single drive motor so as to forcefully eject the card jammed in the card traveling passage.

In addition, since the ejecting gear is rotatively driven in the same direction as the drive gear by the clutch gear, the transporting and driving force of the pairs of transport rollers, together with the moving force of the ejecting member, can supplementally act on the jammed card, so that the jammed card can be transported reliably in the discharging direction, thereby leading to the improvement of the reliability of the card reader.

DETAILED DESCRIPTION OF THE PREFERRED EMBODIMENTS

First Embodiment

Figure 7:
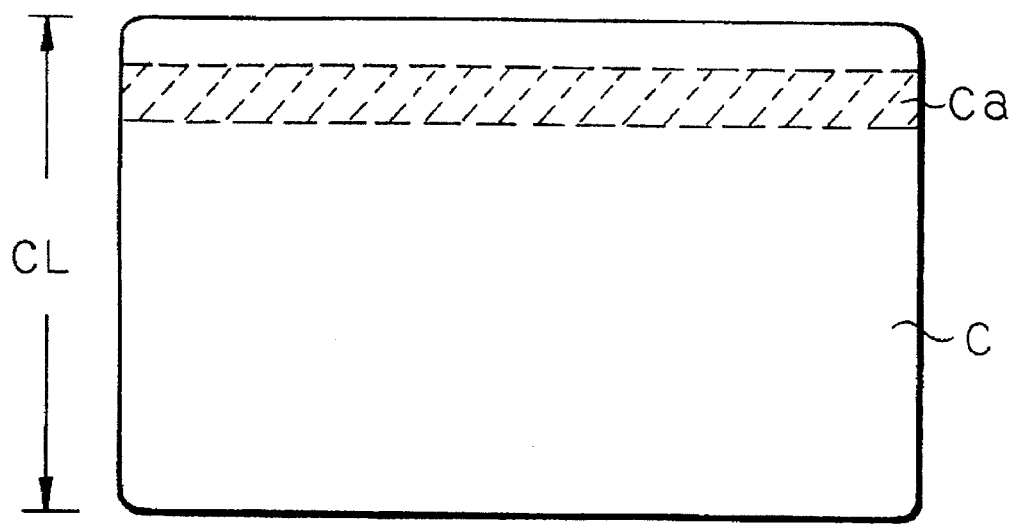
FIG. 7 is a plan view of a magnetic card used for the card reader.
Figure 8A:
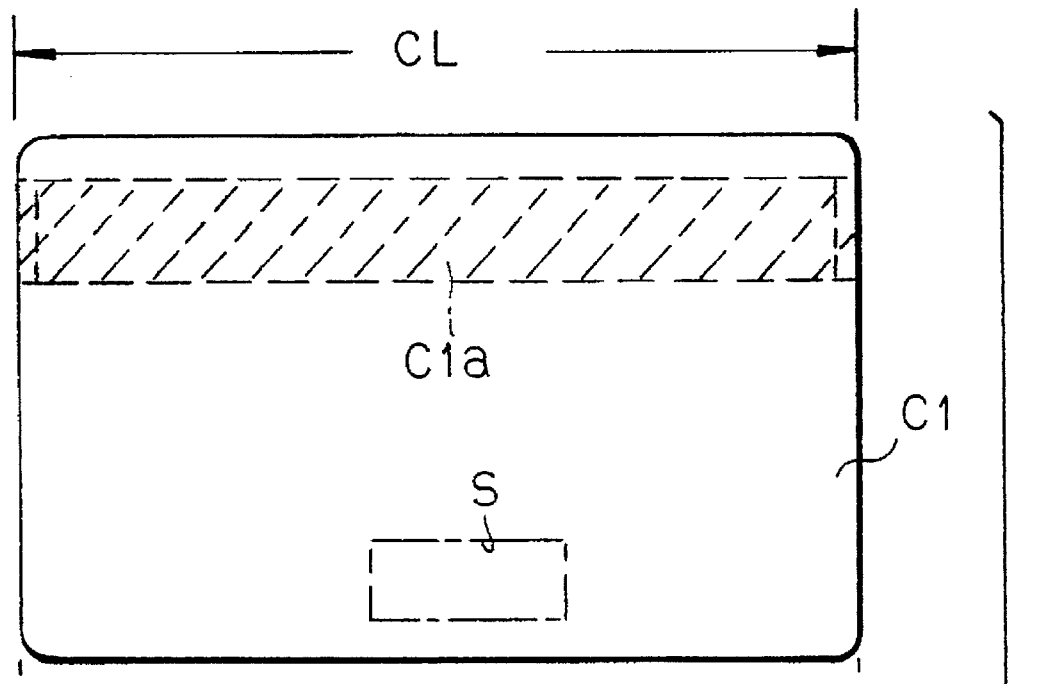
FIG. 8(a) is a plan view of a magnetic card used for the card reader.

First, a description will be given of the configuration of the card reader in which a pad-roller supporting mechanism 30 is mounted in accordance with a first embodiment. The card reader designated generally at reference numeral 1 in FIGS. 1 and 2 can be used commonly for cards C, such as a magnetic card C1 typified by a cash card and shown in FIG. 8(a) and an IC card C2 shown in FIG. 8(b). A reciprocally traveling system in which the card C for which processing has been completed is discharged from a card insertion port 2 is adopted in the card reader 1. As shown in FIG. 7, the card C is provided with a magnetic stripe Ca extending in the longitudinal direction of a vinyl chloride-made card body on one side thereof. Magnetic information is recorded in the magnetic stripe Ca, and the information is read by a magnetic head 7, or magnetic information is recorded or updated, as required.

Figure 2:
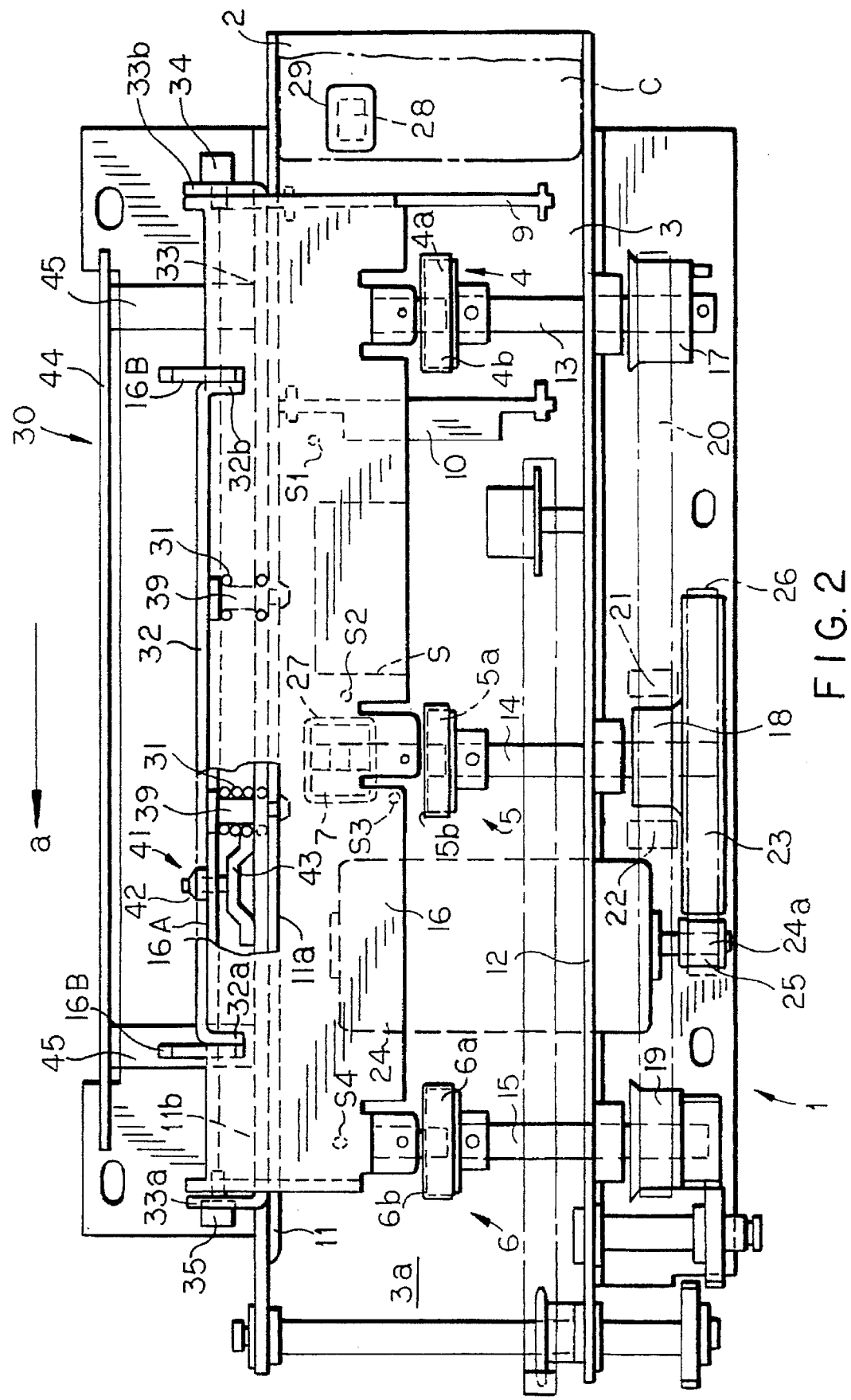
FIG. 2 is a plan view illustrating a schematic arrangement of a pad-roller supporting mechanism and the card reader provided with the pad-roller supporting mechanism in accordance with the embodiment of the present invention.

As shown in FIG. 2, the card reader 1 is mainly composed of: a card traveling passage 3 which is formed in such a manner as to extend from the card insertion port 2 in the card-advancing direction indicated by arrow a; a plurality of pairs of transport rollers 4, 5, and 6 for transporting the card C inserted into the card traveling passage 3; the magnetic head 7 for magnetically processing the card C; and shutters 9 and 10 which are capable of moving into or away from the card traveling passage 3. The card traveling passage 3 is formed between side plates 11 and 12 constituting a main-body block, and an inner surface of the side plate 11 is set as a traveling reference plane 11a used during card transport. The side plate 12 is provided with a pressing member 8 which is urged toward the inside of the card traveling message 3 by a leaf spring 8A so as to transport the inserted card C with one side thereof sliding on the traveling reference plane 11a. The width 3L of the card traveling passage 3 is set to be substantially identical to or slightly smaller than the width CL of the card shown in FIG. 7 (see FIG. 4).

The pairs of transport rollers 4, 5, and 6 are arranged in order from the card insertion port 2 toward a farther end 3a of the card traveling passage 3. Each of the pairs of transport rollers is composed of a drive roller 4a, 5a, or 6a and a pad roller 4b, 5b, or 6b serving as a driven roller. Each of the drive rollers 4a, 5a, and 6a and each of the pad rollers 4b, 5b, and 6b are disposed in face-to-face relation to each other. The drive rollers 4a, 5a, and 6a are disposed below the card traveling passage 3, and are respectively fixed to rotating shafts 13, 14, and 15 pivotally supported by the side plate 12. The pad rollers 4b, 5b, and 6b are supported by a pad roller block 16 disposed above the card traveling passage 3. The pad roller block 16 constitutes a part of the pad roller supporting mechanism which will be described later.

Pulleys 17, 18, and 19, around which a belt 20 is wound, are respectively fixed to the rotating shafts 13, 14, and 15 on the outer side of the slide plate 12. Rotatable rollers 21 and 22 are respectively disposed on both sides of the pulley 18 so as to impart tension to the belt 20 on both sides of the pulley 18. A drive pulley 23 having a diameter larger than that of the pulley 18 is fixed to the rotating shaft 14. A drive belt 26 is trained between the drive pulley 23 and a small-diameter drive pulley 25 fixed to a drive shaft 24a of a reversible motor 24 serving as a driving source.

As a head surface 7a is brought into contact with the magnetic stripe Ca of the magnetic card, the magnetic head 7 reads magnetic information recorded in the stripe, or records magnetic information in the stripe. The magnetic head 7 is disposed at a position opposing the magnetic stripe Ca via the card traveling passage 3.

The magnetic head 7 is located above the axis of the drive roller 5a at a position close to the card traveling reference plane 11a, and its head surface is made to slightly project into the card traveling passage 3. A pad roller 27 supported by the pad roller block 16 is disposed in face-to-face relation to the magnetic head 7. Either the pad roller 27 or the magnetic head 7 is urged toward the other so as to nip the card C being transported with a predetermined pressing force. In this embodiment, the magnetic head 7 is urged toward the pad roller 27 by a leaf spring 7b.

In the vicinity of the insertion port 2, the prehead 28 which comes into contact with the magnetic stripe Ca of the card projects slightly into the card traveling passage 3 from below. This prehead 28 is constituted by a magnetic head and detects the type of the card on the basis of the presence or absence of a magnetic signal from the card C. Here, the prehead 28 constitutes a part of a trigger for controlling the starting of the motor 20 and the opening and closing operation of the shutters 9 and 10. Additionally, a pad roller 29 is disposed above the card traveling passage 3 at a position located on the side opposing the prehead 28.

The shutter 9 is disposed between the pair of transport rollers 4 and the card insertion port 2, while the shutter 10 is disposed between the pair of transport rollers 4 and the pair of transport rollers 5, so that the shutters 9 and 10 are capable of moving into and out of the card traveling passage 3. The shutters 9 and 10 are connected to unillustrated electromagnetic solenoids. For instance, an arrangement is normally provided so that, with the shutter 10 moved into the card traveling passage 3, the shutter 9 is set in a state in which it is retreated from the traveling passage, whereas if the card inserted into the insertion port 2 is the magnetic card C, the shutter 10 is opened to allow the card C to be taken in. After the card C is taken into the card traveling passage 3, the shutter 9 is closed so as to prevent the entry of foreign objects and not to take cards in consecutively.

Next, a description will be given of the pad-roller supporting mechanism designated generally at reference numeral 30. The pad-roller supporting mechanism 30 is mainly composed of: the pad roller block 16 for supporting the pad rollers 4b, 5b, and 6b for transporting the card C inserted into the card traveling passage 3 in cooperation with the drive rollers 4a, 5a, and 6a; a pair of coil springs 31 serving as spring members provided on the side plate 11; and a pressing plate 32 which can be detachably engaged with the pad roller block 16 and the coil springs 31.

The pad roller block 16 is formed having a width which is about one third of the width of the card traveling passage 3, rotatably supports the pad rollers 4b, 5b, and 6b, and is disposed substantially in the center of the card traveling passage 3. The pad roller block 16 is supported by opposite ends 33a and 33b of a support plate 33, which is fitted integrally to an outer surface 11b of the side plate 11, i.e., the rear side of the card traveling reference plane 11a. The pad roller block 16 is openably supported by pivot pins 34 and 35 provided so as to be parallel with the card traveling passage 3, whereby the pad roller block 16 allows the pad rollers 4b, 5b, and 6b to move toward and away from the drive rollers 4a, 5a, and 6a, respectively.

The pad roller 27 is rotatably supported by the pad roller block 16 at a position opposing the magnetic head 7 so as to cause its peripheral surface to slightly project into the card traveling passage 3. Also, optical card sensors S1, S2, S3, and S4 for detecting the position of the card C in the card traveling passage 3 are provided on the pad roller block 16. Additionally, an IC contact attaching portion S is formed at a position located between the driven rollers 4b and 5b.

Figure 4:
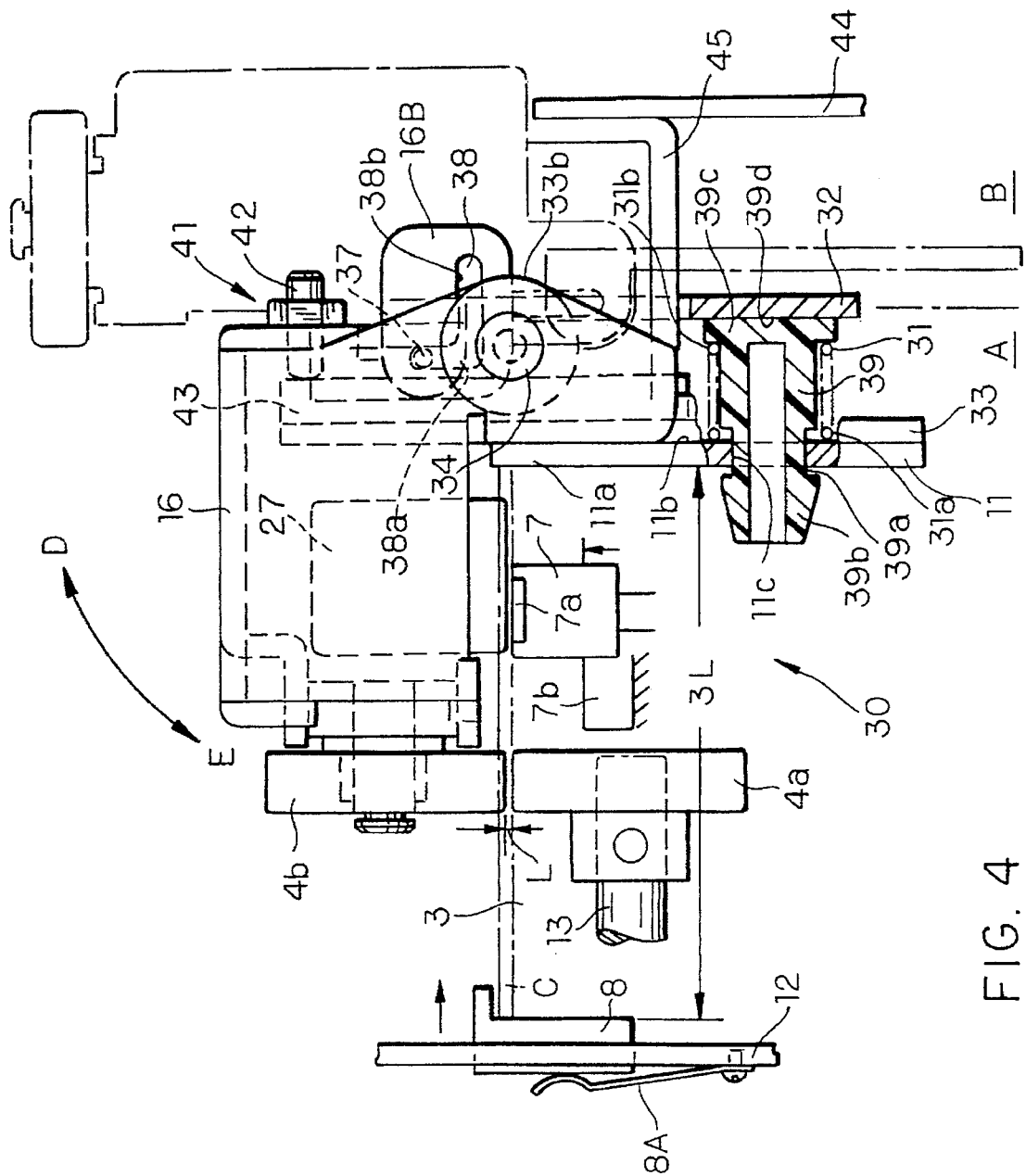
FIG. 4 is a front elevational view illustrating an arrangement of the pad-roller supporting mechanism.

The coil springs 31 impart to the pad roller block 16 via the pressing plate 32 a rotating bias in the closing direction indicated by arrow E in FIG. 4 for causing the driven rollers to abut against the drive rollers. Each coil spring 31 is wound around a socket 39 supported slidably by the side plate 11, and is provided on the outer surface 11b of the side plate. The coil spring 31 has one end 31a abutting against the outer surface 11b and another end 31b abutting against an outer end 39c of the socket 39.

As shown in FIG. 4, the socket 39 has a recess 39a formed for restricting its sliding range with respect to the side plate 11. The socket 39 is formed of a plastic resin, and its center is made hollow, so that the socket 39 is made radially deformable. A distal end 39b of the socket 39 is formed in the shape of a frustum of a cone having a diameter larger than that of a hole 11c formed in the side plate 11 for inserting the socket 39.

The pressing plate 32 has pins 36 and 37 serving as projections and formed on upper portions of both sides 32a and 32b thereof. The pins 36 and 37 are engaged in L-shaped guide grooves 38 which are respectively formed in hinge portions 16B formed on a back plate 16A of the pad roller block 16 in such a manner as to extend to the outside from the card reader. The pins 36 and 37 are engaged in and guided by the guide grooves 38, and are swingably supported therein. Each guide groove 38 is formed in the hinge portion 16B such that its short side portion 38a extends upward, and its long side portion 38b extends toward the outside from the card reader 1, such that the guide groove 38 ranges over the operating region and the nonoperating region of the coil spring 31.

Figure 5:
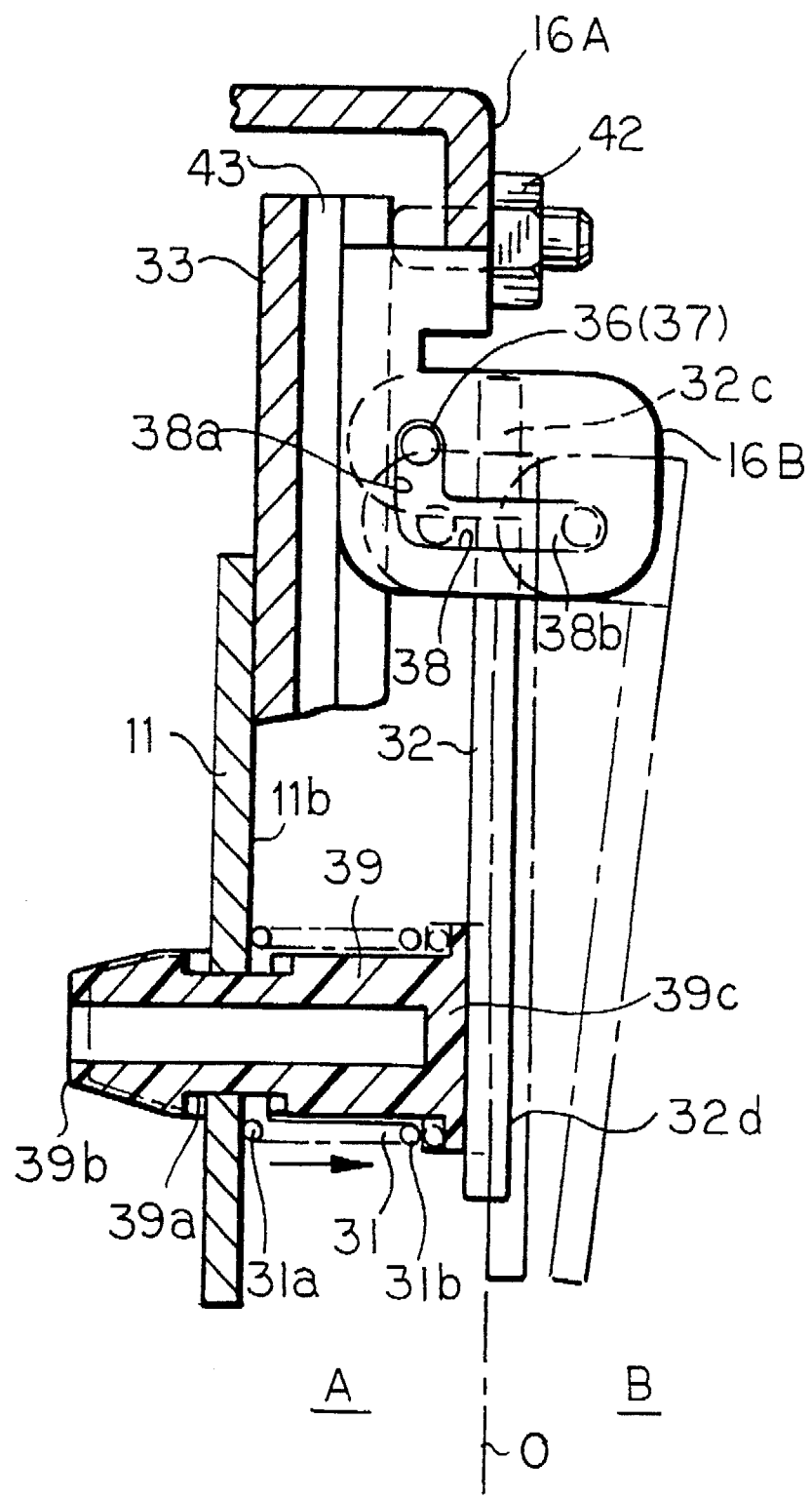
FIG. 5 is an enlarged view illustrating the relationship between a pressing plate and a pad roller block as well as the operation thereof.
Figure 6:
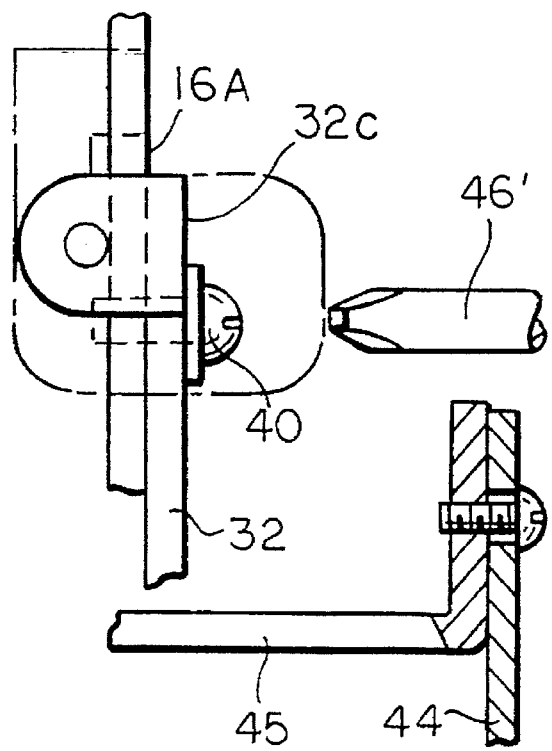
FIG. 6 is an enlarged view illustrating a state in which the pressing plate is attached to the pad roller block.

The operating region of the coil spring 31 refers to the range A which is located on the left-hand side of the line O indicating the position of the outer end 39c of the socket at a time when the socket 39 is slid toward the outside by a maximum degree by the coil spring 31, as shown by the two-dotted dash line in FIG. 5. Meanwhile, the nonoperating region refers to the range B which is located on the right-hand side of the line O. In other words, these ranges refer to the range in which the spring force of the coil spring 31 acts on the pressing plate 32 and the range in which it does not. The short side portion 38a of the guide groove is disposed at least in the range A.

Figure 3:
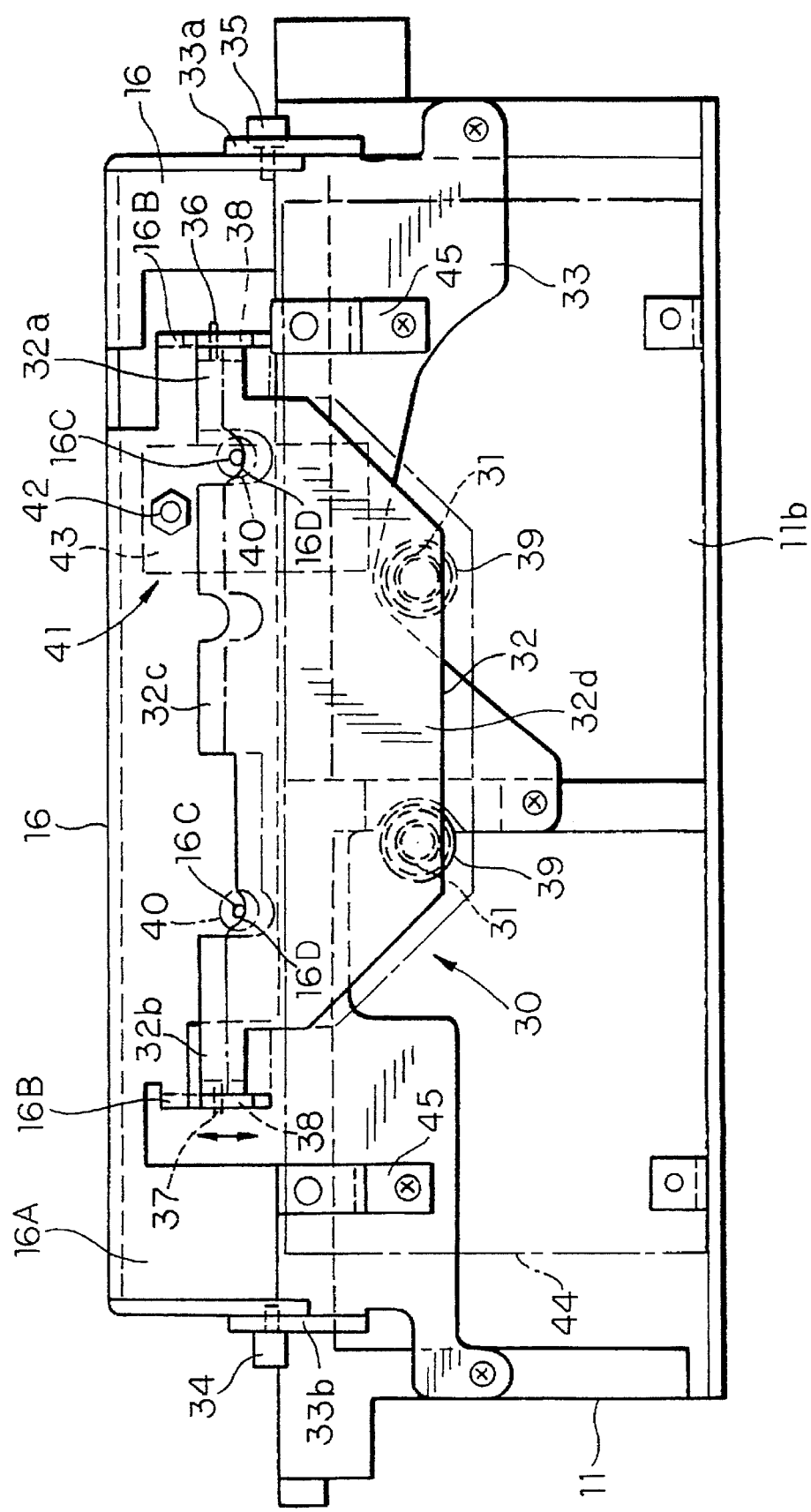
FIG. 3 is a side elevational view of the pad-roller supporting mechanism shown in FIG. 1.

As shown in FIG. 3, formed on an upper portion 32C of the pressing plate 32 are two concave portions 16D with an interval therebetween, each of the concave portions 16D being tightened by a fixing screw 40 which is threadedly engaged in a screw hole 16C formed in the back plate 16A of the pad roller block. Each of the screw holes 16C is provided above the concave portion 16D so that the pressing plate 32 is tightened by the fixing screw 40 when the pressing plate 32 is set in a fixed position indicated by the two-dotted dash line.

A control board 44 for controlling the card reader 1 is attached to the support plate 33 by means of an arm member 45, and the fixing screws 40 for fixing the pressing plate 32 are disposed above the control board 40.

A rotational-range adjusting mechanism 41 is provided above the axis of rotation of the pad roller block 16 which is formed by the pivot pins 34 and 35. As shown in FIG. 4, the rotational-range adjusting mechanism 41 is composed of an adjusting screw 42 provided on the back plate 16A and a stopper plate 43 fixed to the support plate 33. The adjusting screw 42 is passed through the back plate 16A and abuts against the stopper plate 43 so as to adjust the amount of projection of the screw 42, thereby adjusting the interval L between each of the drive rollers 4a, 5a, and 6a and each of the driven rollers 4b, 5b, and 6b. That is, the adjusting screw 42 adjusts the pad pressure of the pad rollers 4b, 5b, and 6b with respect to the drive rollers 4a, 5a, and 6a. Incidentally, in FIG. 4, only one set of the drive roller 4a and the driven roller 4b is shown.

A description will now be given of the operation of the card reader 1 and the pad-roller supporting mechanism 30 constructed as described above.

Operation of the Card Reader in the First Embodiment

If the card C is inserted into the card insertion port 2, and the magnetic signal from the magnetic stripe Ca is detected by the prehead 28, the shutter 10 is retreated from the card traveling passage 3 by the unillustrated electromagnetic solenoid to open the card traveling passage 3, and the drive motor 24 is started to drive the drive shaft 24a. Then, the rotating shaft 14 rotates by means of the belt 26 and the pulley 23, and the shafts 13 and 15 to which the pulleys 17 and 19 are fixed also to rotate simultaneously by means of the belt 20, which in turn causes the pairs of transport rollers 4, 5, and 6 to be driven, thereby allowing the card to be taken into the card traveling passage 3. After the card C is taken in, the shutter 9 is closed to prevent the continuous insertion of cards and the entry of foreign objects into the card traveling passage 3. The inserted card C is subjected to predetermined processing, such as the reading, writing, confirmation (verification), and the like of magnetic information by means of the magnetic head 7. Upon completion of this processing operation, the drive motor 24 is rotated reversely to transport the card C toward the insertion port 2 and discharge the same.

Disassembling Operation of Pad-Roller Supporting Mechanism in the First Embodiment First, the pins 36 and 37 on the pressing plate 32 are engaged in the respective guide grooves 38. At this time, since the pressing plate 32 is not engaged with the sockets 39, the spring forces do not act, so that the rotation of the pad roller block 16 in the opening and closing directions indicated by double-headed arrow DE can be effected freely. Next, the pad roller block 16 is rotated in the closing direction indicated by arrow E to allow the driven roller 4b to be disposed in the card traveling passage 3 in face-to-face relation to the driven roller 4a. Then, the pressing plate 32 supported in the guide grooves 38 is pressed and is allowed to slide in their long side portions 38b. Subsequently, an outer end 39d of each socket located at its maximally projecting position indicated by the two-dotted dash line in FIG. 5 is pressed by a lower portion 32d of the pressing plate 32 by means of the spring forces of the coil springs 31, thereby allowing each socket 39 to be displaced up to the solid-line position and allowing the projections 36 and 37 to be guided into the respective short side portions 38a of the grooves. After the pressing plate 32 is slid until the pins 36 and 37 are guided into the short side portions 38a, the pressing plate 32 is then moved upward and is set in its fixed position indicated by the solid lines in FIG. 3, and is fixed to the rear surface 16A by means of the fixing screws 40.

At this time, since the spring forces of the coil springs 31 act on the lower portion 32d of the pressing plate via the sockets 39, these spring forces act on the back plate 16A to which the pressing plate 32 is fixed, thereby serving as an urging force for the pad roller block 16 in the closing direction.

The rotational range of the pad roller block 16 becomes narrow if the adjusting screw 42 is screwed in to increase the amount of projection of the screw 42 from the back plate 16A with respect to the stopper plate 43. On the other hand, the rotational range of the pad roller block 16 becomes wide if the adjusting screw 42 is loosened to reduce the amount of projection of the adjusting screw 42 with respect to the stopper plate 43. That is, by means of this adjusting screw 42, the interval L between the drive roller 4a and the driven roller 4b can be adjusted to a certain degree, so that the pressing forces of the pad rollers with respect to the drive rollers can be fine-adjusted.

Meanwhile, to cancel the urging force with respect to the pad roller block 16 in the closing direction, it suffices if the fixing screws 40 are loosened, and the pressing plate 32 is slid along the guide grooves 38 up to the nonoperating region B of the coil springs 31.

Since the lower portion 32d is made to abut against the sockets 39 in the operating range A in which the spring forces of the coil springs 31 act, and the pad roller block 16 is urged in the closing direction by means of the pressing plate 32 having its upper portion 32c fixed to the back plate 16A by the fixing screws 40, the opening and closing operation of the pad roller block 16 can be effected easily by canceling the fixing of the pressing plate 32. Since the pressing plate 32 has its shafts 36 and 37 engaged in the guide grooves 38, the pressing plate 32 is supported in the grooves 38 even if it is not fixed to the back plate 16A. Hence, it is possible to prevent the occurrence of the drawback that the pressing plate 32 drops from the guide grooves 38 and becomes lost, and it is possible to improve the operational efficiency at the time when the pressing plate 32 is fixed again to the back plate 16A.

In addition, since the pivot pins 34 and 35 for constituting the pivotal shafts of the pad roller block 16 are pivotally supported by the support plate 33 located outwardly of the traveling reference plane 11a, the pad roller block 16 can be removed completely from above the card traveling passage 3. Hence, it is possible to facilitate the operations of cleaning or maintaining the magnetic head 7 disposed below the card traveling passage 3, and the pad rollers, the card sensors, and the like supported by the block, as well as the operations of attaching and replacing the IC contact to and from the IC contact attaching portion S.

Further, since the fixing screws for fixing the pressing plate to the back plate 16A are located above the control board 44 as shown in FIG. 5, the screws 40 can be manipulated by a screwdriver 46' without removing the control board 44, so that the attachment and detachment of the pressing plate to and from the back plate 16A can be effected easily.

It should be noted that although, in this embodiment, the pad-roller supporting mechanism 30 is applied to the card reader 1 of the reciprocally traveling system in which the processed card C is returned to the card insertion port 2, the pad-roller supporting mechanism 30 may, of course, be applied to the card reader of a one-way traveling type in which the processed card is discharged from the farther end 3a side of the card traveling passage 3.

In addition, the rollers 4b, 5b, and 6b may be driven in the following manner: A belt is trained around pulleys fixed to the shafts of the three rollers 4b, 5b, and 6b supported by the pad roller block 16, and a belt-driving pulley and a gear are supported by the block 16, while a gear which is rotated by the motor 24 is supported by the main-body block, and the two gears are made capable of meshing with each other.

As described above, in accordance with the first embodiment of the present invention, since the urging force acting on the pad roller block in the closing direction can be canceled by displacing the pressing plate between the operating region and the nonoperating region of the spring member, the opening and closing operation of the pad roller block can be effected easily. Hence, the assembling operation and the maintenance operation can be carried out efficiently. This leads to a reduction in the manufacturing cost of the card reader.

In accordance with the first embodiment of the invention, even if the engagement between the pressing plate and the pad roller block is canceled, the pressing plate is held in the L-shaped guide grooves by virtue of the engagement of its projections and the L-shaped guide grooves. Therefore, it is possible to reduce the number of cases where the pressing plate becomes lost, and to improve the operational efficiency at the time when the pressing plate is engaged with the pad roller block again.

In accordance with the first embodiment of the present invention, since the pivotal shafts of the pad roller block are provided on the outer side of the card traveling reference plane, the pad roller block can be removed completely from above the card traveling passage when the block is opened. Hence, the maintenance operation and the like can be carried out efficiently.

Second Embodiment

Hereafter, a description will be given of a second embodiment of the present invention with reference to the drawings. The card reader designated generally at reference numeral 1 in FIGS. 1 and 9 can be used commonly for the cards C, such as the magnetic card C1 typified by a cash card and shown in FIG. 8(a) and the IC card C2 shown in FIG. 8(b). The reciprocally traveling system in which the card C for which processing has been completed is discharged from the card insertion port 2 is adopted in the card reader 1.

Figure 10:
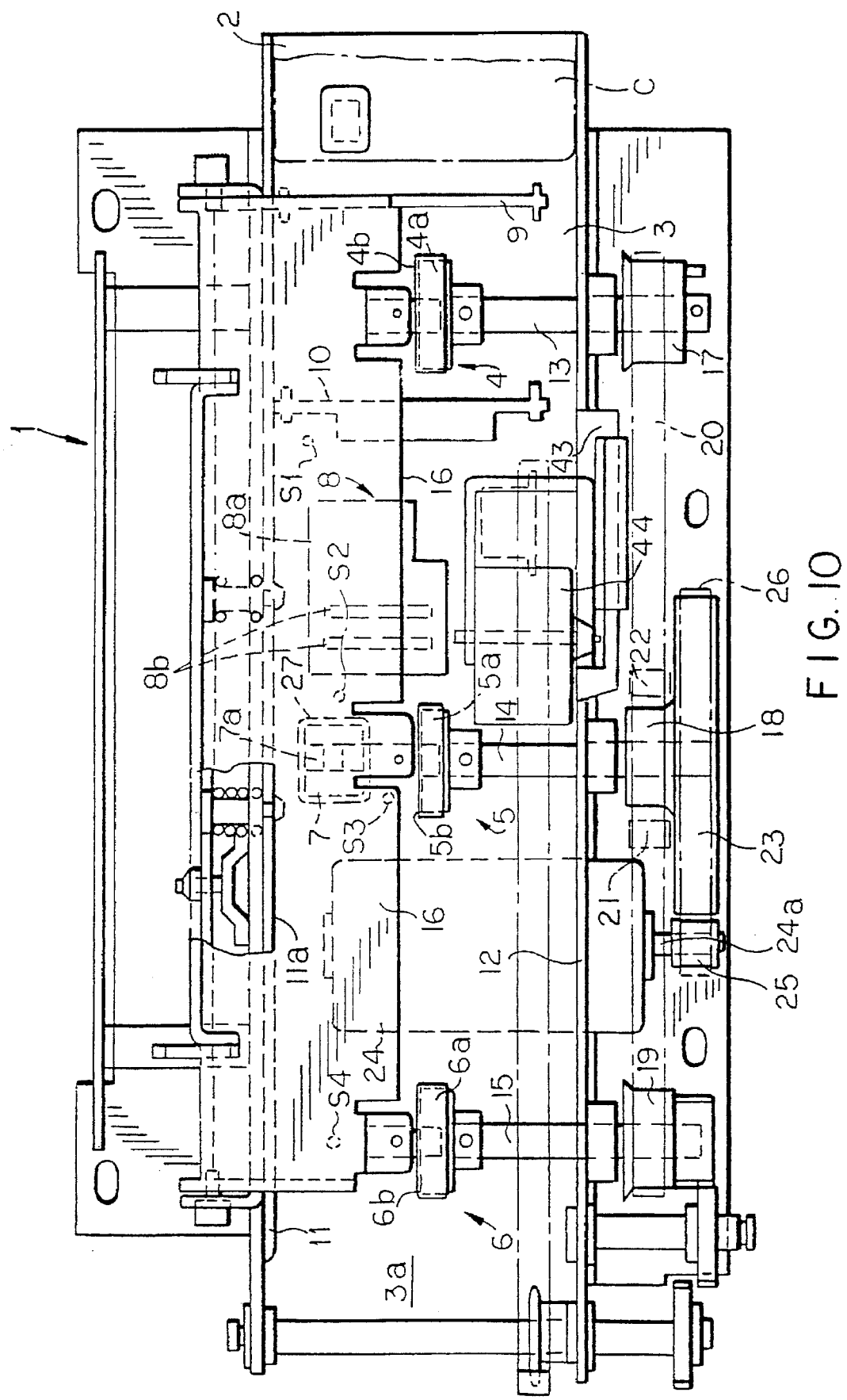
FIG. 10 is a plan view of the card reader shown in FIG. 2.

The card reader 1 is mainly composed of: the card traveling passage 3 which is formed in such a manner as to extend from the card insertion port 2 in the card-advancing direction indicated by arrow a; three pairs of transport rollers including first, second, and third pairs of transport rollers 4, 5, and 6 for transporting the card C inserted into the card traveling passage 3; the magnetic head 7 for magnetically processing the card C; an IC contact 46 for electrically processing the IC card C2; and the shutters 9 and 10 which are capable of moving into or away from the card traveling passage 3. As shown in FIG. 10, the card traveling passage 3 is formed between the side plates 11 and 12, and the inner wall surface of the side plate 11 is set as the traveling reference plane 11a used during card transport. The side plate 12 is provided with an unillustrated pressing mechanism for pressing the side plate 12 so as to transport the inserted card C along the traveling reference plane 11a.

The pairs of transport rollers are arranged in the order of the first pair of transport rollers 4, the second pair of transport rollers 5, and the third pair of transport rollers 6 from the card insertion port 2 toward the farther end 3a of the card traveling passage 3. The distance L between the shafts of the first pair of transport rollers 4 and the second pair of transport rollers 5 and the distance L' between the shafts of the second pair of transport rollers 5 and the third pair of transport rollers 6 are each set to be shorter than the overall length CL of the card C shown in FIG. 8. The interval L1 from the card insertion port 2 to the axial center of the first pair of transport rollers 4 is set to be shorter than the overall length CL of the card by 30 mm or more. The interval L1 here is defined as being a dimension in which 30 mm is subtracted from the overall length CL of the card, and an amount of biting b of the card C by the first pair of transport rollers 4 is further subtracted from the subtracted value. This amount of biting b is the distance from the position of contact between the leading end of the card C and the first pair of transport rollers 4 to the axial center of that pair of rollers.

The first, second, and third pairs of transport rollers 20 are respectively composed of the drive rollers 4a, 5a, and 6a and the driven rollers 4b, 5b, and 6b, which are disposed in face-to-face relation to each other. The drive rollers 4a, 5a, and 6a are disposed below the card traveling passage 3, and are respectively fixed to the rotating shafts 13, 14, and 15 which are pivotally supported by the side plate 12. The driven rollers 4b, 5b, and 6b which are located above the card traveling passage 3 are rotatably supported by the pad roller block 16 serving as a support provided on the side of the reference plane 11a. The peripheral surfaces of the driven rollers 4b, 5b, and 6b are in contact with the peripheral surfaces of the drive rollers 4a, 5a, and 6a in the card traveling passage 3.

The pad roller block 16 is rotatably supported by the side plate 11, and is openably movable between its closed position in which the driven rollers are brought into contact with the drive rollers and its open position in which the driven rollers are retreated from the card traveling passage 3. The pad roller block 16 is formed with a width which is about one third of the width of the card traveling passage 3, rotatably supports the pad rollers 4b, 5b, and 6b, and places the driven rollers 4b, 5b, and 6b, which it supports, substantially in the center of the card traveling passage 3. That is, a space is formed between the pad roller block 16 and the card traveling passage 3 on the opposing side.

The pad roller block 16 is provided with an urging force in the closing direction by the unillustrated pressing mechanism to bring the driven rollers into pressure contact with the respective drive rollers. Additionally, the pad roller 27 is rotatably supported by the pad roller block 16 at a position opposing the magnetic head 7 so as to cause its peripheral surface to slightly project into the card traveling passage 3. Also, the optical card sensors S1, S2, S3, and S4 for detecting the position of the card C in the card traveling passage 3 are provided on the pad roller block 16.

The pulleys 17, 18, and 19, around which the belt 20 is wound, are respectively fixed to the rotating shafts 13, 14, and 15 on the outer side of the slide plate 12. The rotatable rollers 21 and 22 are respectively disposed on both sides of the pulley 18 so as to impart tension to the belt 20 on both sides of the pulley 18. The drive pulley 23, having a diameter larger than that of the pulley 18, is fixed to the rotating shaft 14. The drive belt 26 is trained between the drive pulley 23 and the small-diameter drive pulley 25 fixed to the drive shaft 24a of the reversible motor 24 serving as the driving source.

Figure 9:
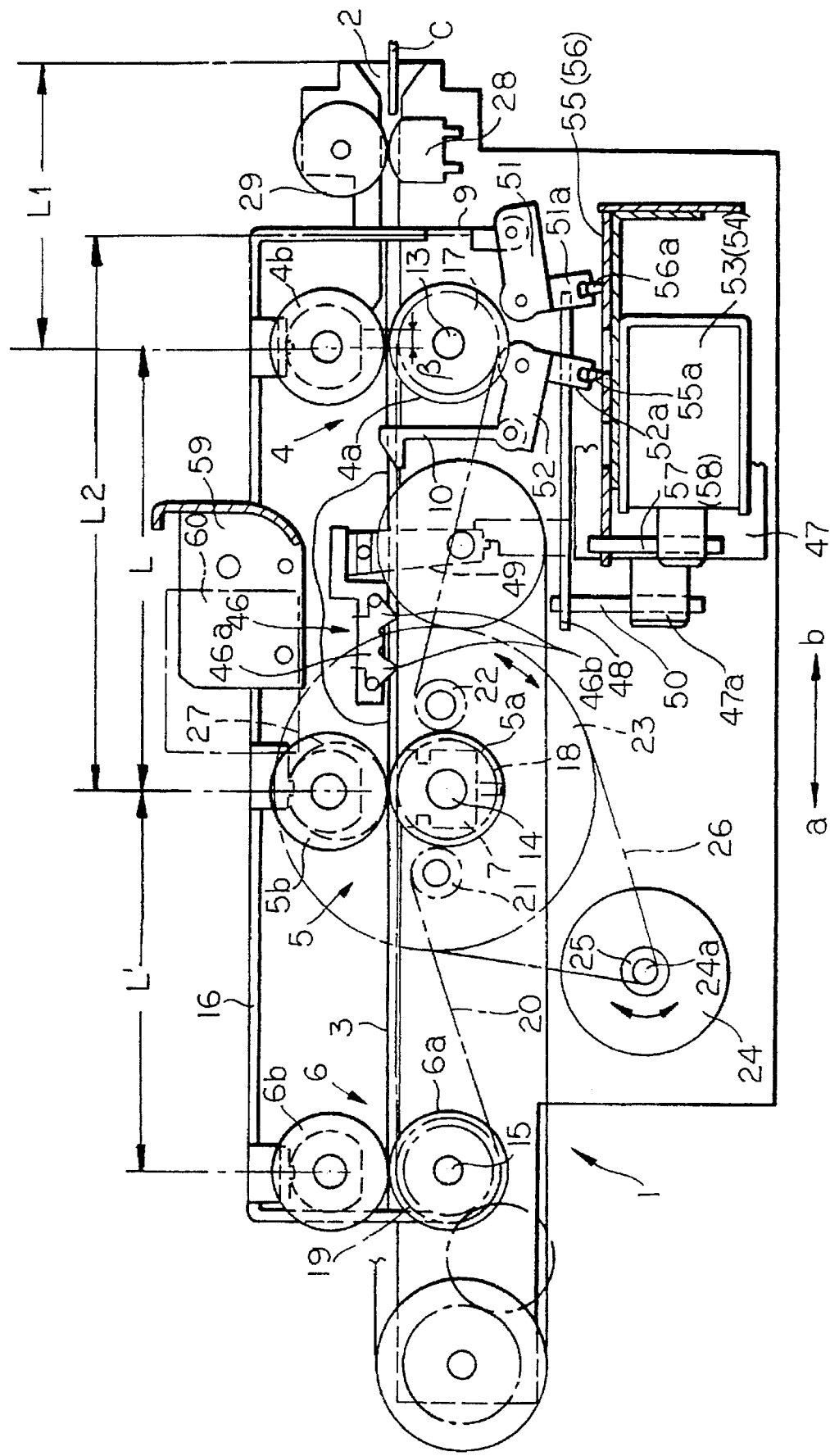
FIG. 9 is a side elevational view illustrating a schematic arrangement of the card reader shown in FIG. 1.

When the card is taken in, the drive motor 24 rotates in such a manner as to rotatively drive the drive rollers 4a, 5a, and 6a counterclockwise in FIG. 9, and is controlled by an unillustrated controlling means so as to rotate in the reverse direction to that during the taking-in operation after the operation of reading or recording the card C by the magnetic head 7. When the card C for which the reading operation has been completed is the IC card C2, and when the card abuts against the shutter 9 or finishes passing over the magnetic head 7, the drive motor 24 is temporarily stopped, and electrical processing is carried out by the IC contact 46, whereupon the drive motor 24 is driven again.

The magnetic head 7 is located above the axis of the drive roller 5a at a position close to the card traveling reference plane 11a, and its head surface 7a is made to slightly project into the card traveling passage 3. As for the magnetic head 7 and the pad roller 27, either the pad roller 27 or the magnetic head 7 is urged toward the other by an unillustrated spring so as to nip the card C being transported with a predetermined pressing force. In this embodiment, the magnetic head 7 is urged toward the pad roller 27, and a small clearance smaller than the thickness of the card is formed between the head 7 and the pad roller 27.

The magnetic head 7 is brought into contact with a magnetic stripe C1a of the magnetic card C1 or the magnetic stripe C2a of the IC card C2 shown in FIG. 8(a, b), and reads the magnetic information recorded in the stripe or records magnetic information in the stripe. The magnetic head 7 is disposed so as to oppose the stripe via the card traveling passage 3.

Figure 8B:
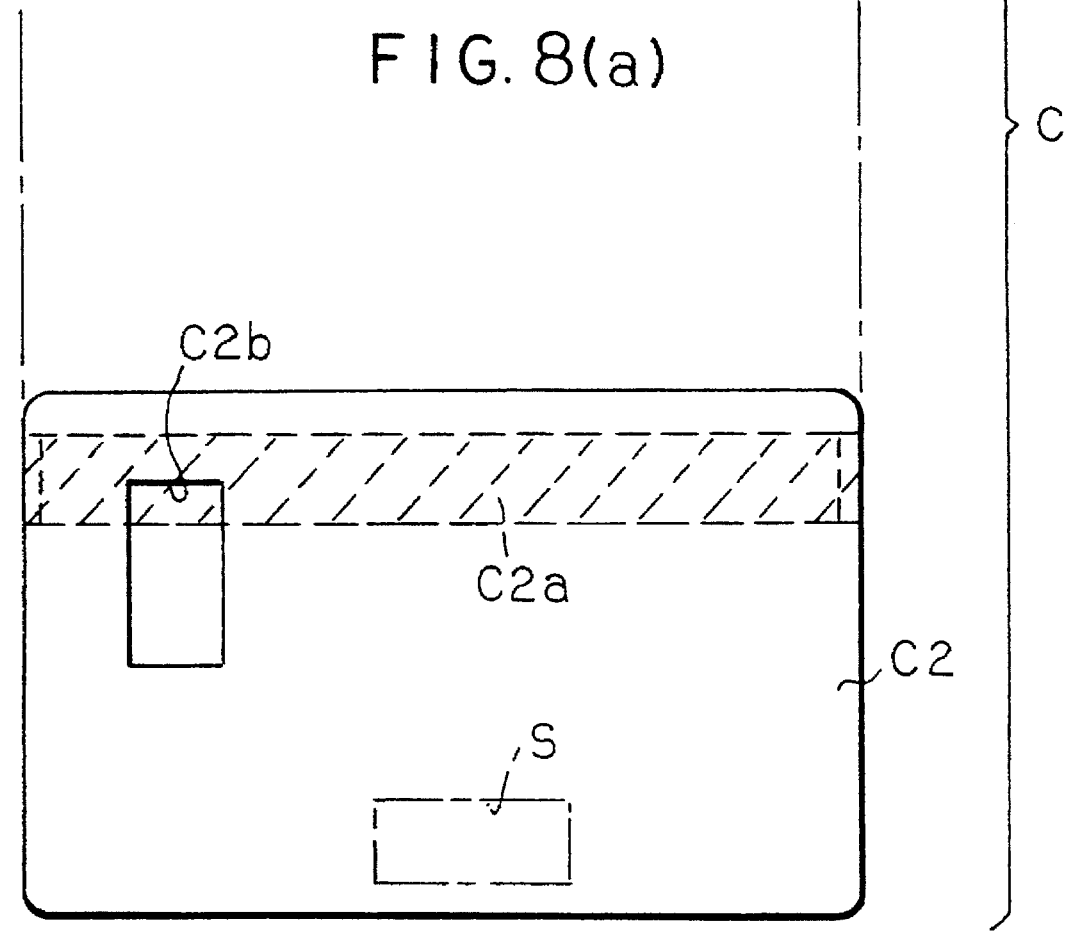
FIG. 8(b) is a plan view of an IC card.

A description of the magnetic card C1 and the IC card C2 follows. The magnetic card C1 shown in FIG. 8(a) 20 has the magnetic stripe C1a extending in the longitudinal direction of a vinyl chloride-made card body on one side thereof. Magnetic information is recorded in the magnetic stripe C1a, and the information is read by the magnetic head 7, or magnetic information is recorded or updated, as required. The IC card C2 shown in FIG. 8(b) is a card having an electrically recording means (not shown) inside it. The IC card C2 is provided with an input/output section C2b for reading (reproducing) information stored in the recording means or writing (recording) information in the recording means, as well as the magnetic stripe C2a in which magnetic information for allowing the card reader to recognize that the card is an IC card is recorded. Here, the magnetic stripe C1a or C2a is provided on the reverse surface of the card, and the input/output section C2b is provided on the obverse surface of the card. Additionally, nonrecording portions are formed at both ends of the magnetic stripe C1a or C2a.

Figure 11:
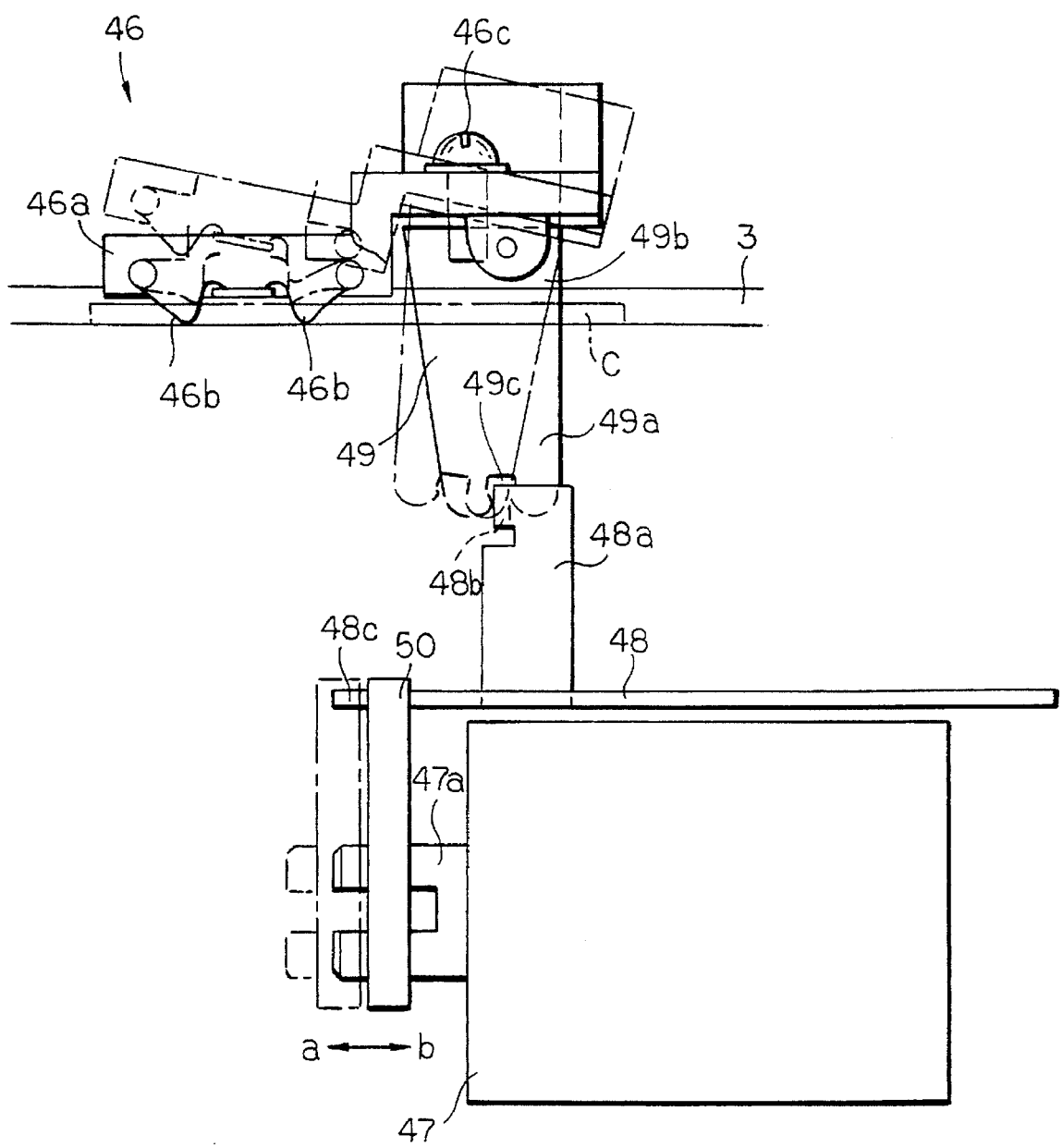
FIG. 11 is a side elevational view illustrating an arrangement and operation of a mechanism for driving an IC contact.

The IC contact 46 is swingably supported by the pad roller block 16 located between the first pair of transport rollers 4 and the second pair of transport rollers 5, and a plurality of contact pieces 46b are juxtaposed on a main body 46a thereof. The contact 46 is disposed at a position where the contact pieces 46b are opposed to the input/output section C2b of the card when the IC card C2 is held between the first pair of rollers 4 and the second pair of rollers 5. As shown in FIG. 11, fixed to the main body 46a is an arm plate 49 for engaging a slide plate 48 which is slid in the card-moving direction shown by double-headed arrow ab by means of an electromagnetic solenoid 47. The arm plate 49 has a proximal end 49b fixed to a rotating end of the main body 46a by a screw 46c and a free end 49a extending downward in the card reader 1. The free end 49c has an indent 49c for engaging a distal end 48b of a projecting portion 48a which is formed on the slide plate 48. One end 48c of the slide plate 48 is secured to a pin 50 provided on a movable piece 47a of the electromagnetic solenoid 47.

When the IC card C2 is inserted, the electromagnetic solenoid 47 is driven to set the IC contact 46 in a position in which it is moved into the card traveling passage 3. When a card other than the IC card C2 is inserted, the electromagnetic solenoid 47 is driven to set the IC contact 46 in a retreated position indicated by the two-dotted dash lines. The contact pieces 46b are formed of an electrically conductive spring material, and are attached to the main body 46a in a direction in which they project from the main body toward the card traveling passage 3, so as to be brought into pressure contact with an input/output section C3b.

In the vicinity of the insertion port 2, the prehead 28 which comes into contact with the magnetic stripe C1a or C2a of the card projects slightly into the card traveling passage 3 from below, as shown in FIGS. 9 and 10. The prehead 28 is constituted by a magnetic head, and detects the type of card on the basis of the presence or absence of a magnetic signal from the card C. Here, the prehead 28 constitutes a part of a trigger for controlling the starting of the motor 24, the driving of the electromagnetic solenoid 47, and the opening and closing operation of the shutters 9 and 10. Additionally, the rotatable pad roller 29 is disposed above the card traveling passage 3 at a position located on the side opposing the prehead 28.

Figure 12:
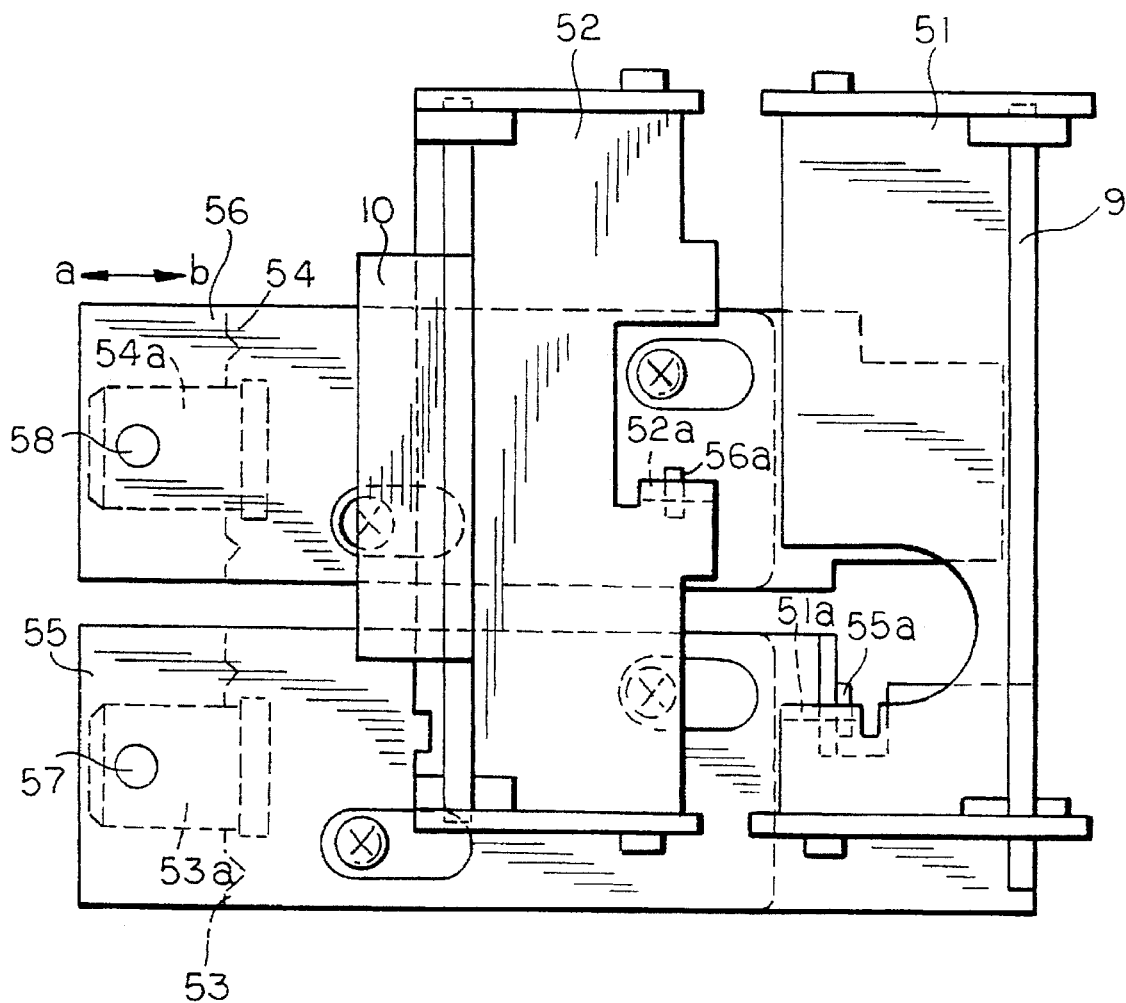
FIG. 12 is a plan view illustrating an arrangement of a mechanism for driving shutters.

The shutter 9 is disposed between the first pair of transport rollers 4 and the card insertion port 2, while the shutter 10 is disposed between the first pair of transport rollers 4 and the second pair of transport rollers 5, such that the shutters 9 and 10 are capable of moving into and out of the card traveling passage 3. As shown in FIGS. 9 and 12, the shutters 9 and 10 are rotatably supported by side surfaces of arms 51 and 52 which are swingably supported by an immovable portion of the card reader. Bent portions 51a and 52a for engaging respective projections 55a and 56a of moving plates 55 and 56, which are slid by shutter-driving electromagnetic solenoids 53 and 54 located in a lower portion of the apparatus, are formed on the arms 51 and 52 in such a manner as to project downward. The moving plates 55 and 56 are connected to movable rods 53a and 54a of the electromagnetic solenoids 53 and 54 by means of pins 57 and 58, respectively, and are slidable in the card traveling directions a and b. As the moving plates 55 and 56 move, the shutters 9 and 10 are moved into and away from the card traveling passage 3. The interval L2 between the shutter 9 and the axial center of the second pair of transport rollers 5 is set to be longer than the card length CL.

The electromagnetic solenoids 53 and 54 are driven by detected signals from the prehead 28 such that, with the shutter 10 moved into the card traveling passage 3, the shutter 9 is normally set in a state in which it is retreated from the traveling passage, whereas if the card inserted into the insertion port 2 is the magnetic card C1 or the IC card C2, the shutter 10 is opened to allow the card C to be taken in. After the card C is taken into the card traveling passage 3, the shutter 9 is closed so as to prevent the entry of foreign objects and not to take cards in consecutively.

A description will be given of the operation of the card reader 1 constructed as described above.

First, the card C is inserted into the card insertion port 2. Upon detection of the magnetic signal from the stripe C1a (or C2a) by the prehead 28, the electromagnetic solenoid 54 is driven to retreat the shutter 10 from the card traveling passage 3 and open the card traveling passage 3, and the drive motor 24 is started to drive the drive shaft 24. Then, this rotation is imparted to the pulley 23 by means of the belt 26 to rotate the rotating shaft 14. As the shaft 14 is rotatively driven, the shafts 13 and 15, to which the pulleys 17 and 19 are respectively fixed, are also rotated simultaneously by means of the belt 20, thereby driving the pairs of transport rollers 4, 5, and 6 in the card traveling passage 3. If the inserted card C is the IC card C2, the electromagnetic solenoid 47 is driven to set the IC contact 46 in the card traveling passage 3.

When the card C is further inserted, and its leading end abuts against the first pair of transport rollers 4, the card is taken in and is transported on the card traveling passage 3. When the card C finishes passing over the shutter 9 and is taken into the card traveling passage 3, the shutter 9 is closed. Hence, the continuous insertion of cards and the entry of foreign objects into the card traveling passage 3 are prevented. As for the inserted card C, the magnetic information is first read by the magnetic head 7, and when the reading operation is completed, the card C is transported toward the insertion port 2 as the drive motor 24 is rotated reversely.

If the inserted card is the IC card C2, and when the card passes over the magnetic head 7 and abuts against the shutter 9, the drive motor 24 is temporarily stopped. Then, the input/output section C2b and the contact pieces 46b of the IC contact 46 located in the card traveling passage 3 contact each other, and electrical processing of the IC card is carried out to record necessary information. Upon completion of this electrical recording operation, the drive motor 24 is driven again to transport the IC card C2 to the magnetic head 7 where magnetic recording is carried out.

Meanwhile, if the inserted card is the magnetic card C1, and when the card passes over the magnetic head 7 and abuts against the shutter 9, the drive motor 24 is rotated forwardly to transport the card to the magnetic head 7 where the operation of recording magnetic information is carried out.

When the recording processing of the card C is completed, the drive motor 24 is rotated reversely to transport the card toward the insertion port 2, and the information recorded in the magnetic stripe is verified (reconfirmed) by the magnetic head 7 in the course of its transport, and is discharged from the insertion port 2.

At this time, since the interval L1 from the card traveling passage insertion port 2 to the axial center of the first pair of transport rollers 4 is set to be shorter than the card length by 30 mm plus b, that short portion of the setting projects from the card insertion port 2. Accordingly, when pulling out the card C from the insertion port 2, since the card C projects from the insertion port 2 by at least 30 mm or more, the operator can positively hold the card C between his or her fingers, thereby facilitating the insertion and withdrawal of the card with respect to the card insertion port 2.

Thus, since the IC contact 46 is disposed between the first pair of transport rollers 4 and the drive roller 5a of the second pair of transport rollers 5 disposed substantially in the center of the card traveling passage 3, the information processing of the IC card C2 by the IC contact 46 can be effected upstream of the magnetic head 7. Hence, it is unnecessary to provide a fourth pair of transport rollers as compared to a card reader in which the IC contact 46 is provided at the farther end 3a of the card traveling passage 3, thereby making it possible to shorten the card traveling passage 3. This can contribute to the making of the card reader compact.

In addition, since the magnetic head 7 is disposed above the axis of the second pair of transport rollers 5, magnetic information is recorded and reproduced with respect to the magnetic stripe C1a or C2a by the magnetic head 7 after the card C has been nipped by the pair of transport rollers 5 and the transporting speed has become stable. Therefore, the recording and reproduction of the magnetic information.

Furthermore, since the interval L2 between the shutter 9 and the second pair of transport rollers 5 is set to be longer than the overall length CL of the card, the card C can be held within the interval L2 by causing the card C to abut against the shutter 9 and stopping the drive motor 24. This means that the electrical processing by the IC contact 46 and the magnetic processing by the magnetic head 7 can be effected separately within a limited space between the second pair of transport rollers 5 and the shutter 9.

Although in this embodiment the so-called reciprocally traveling system is adopted in which each inserted card is returned to the insertion port 2 and is discharged therefrom, the present invention is also applicable to a card reader of the one-way traveling system in which the card C is discharged from the third pair of transport rollers 6 side.

In addition, although the IC contact 46 is controlled by the electromagnetic solenoid 47 such that the IC contact 46 advances into the card traveling passage 3 after completion of the reading operation by the magnetic head 7, as another example, the IC contact 46 may be advanced into the card traveling passage 3 by driving the electromagnetic solenoid 47 when the driving of the drive motor 24 is temporarily stopped and the IC card C2 is held between the second pair of transport rollers 5 and the shutter 9. If such an arrangement is adopted, it is possible to reduce the resistance to the card during transport.

Furthermore, since a space is formed above the card traveling passage 3 at a position located on the side opposing the pad roller block 16, it is possible to dispose the security sensor in this space. The security sensor is conventionally provided on the farther side of the card traveling passage 3. In this case, as shown in FIGS. 9 and 10, a bracket 59 is provided on the side plate 12 at a position located between the first pair of transport rollers 4 and the second pair of transport rollers 5, and a security sensor 60 is provided on the bracket 59. For use as the security sensor, an infrared sensor, a magnetic sensor, or the like for reading an identification label such as an infrared bar code, a magnetic bar code, or the like is provided on the card C and indicated by reference character S in FIG. 8.

As the pad roller block 16 is thus provided on the card traveling reference plane 11a side, the security sensor 60 is disposed between the first pair of transport rollers 4 and the second pair of transport rollers 5 by being offset from the position of the magnetic head 7. Hence, it is unnecessary to provide the security sensor 60 on the farther side of the card traveling passage 3 in the conventional manner, thereby making it possible to shorten the card traveling passage 3.

In accordance with the second embodiment of the present invention, since the IC contact is disposed between the first pair of transport rollers and the second pair of transport rollers, the card traveling passage can be shortened, so that the card reader can be made compact.

In accordance with the second embodiment of the present invention, since the rollers located above the card traveling passage and the IC contact are supported by the support disposed on the traveling reference plane side of the card traveling passage, a space can be formed above the card traveling passage at a position located on the side opposing the pad roller block, so that it is possible to dispose the security sensor and the like in this space. Hence, the card traveling passage can be shortened, and the card reader can be made compact.

In accordance with the second embodiment of the invention, since the magnetic head is disposed above the axis of the drive roller constituting one of the rollers of the second pair of transport rollers, card processing can be effected by the magnetic head after the card-transporting speed has become stable. Hence, it is possible to reduce cases of faulty recording and reproduction of magnetic information.

In accordance with the second embodiment of the present invention, since the interval between the second pair of transport rollers and the shutter is set to be longer than the length of the card, and the interval between the first pair of transport rollers and the card insertion port is set to be shorter than the length of the card by 30 mm or more, when the card projects by at least 30 mm or more from the card traveling passage, the card is not subjected to feeding action of the first pair of transport rollers. In addition, the card can be held between the shutter and the second pair of transport rollers. Accordingly, it is possible to obtain a card reader which permits reliable withdrawal and insertion of the card, and facilitates its use.

Third Embodiment

Hereafter, a description will be given of a third embodiment of the present invention with reference to the drawings.

Figure 1:
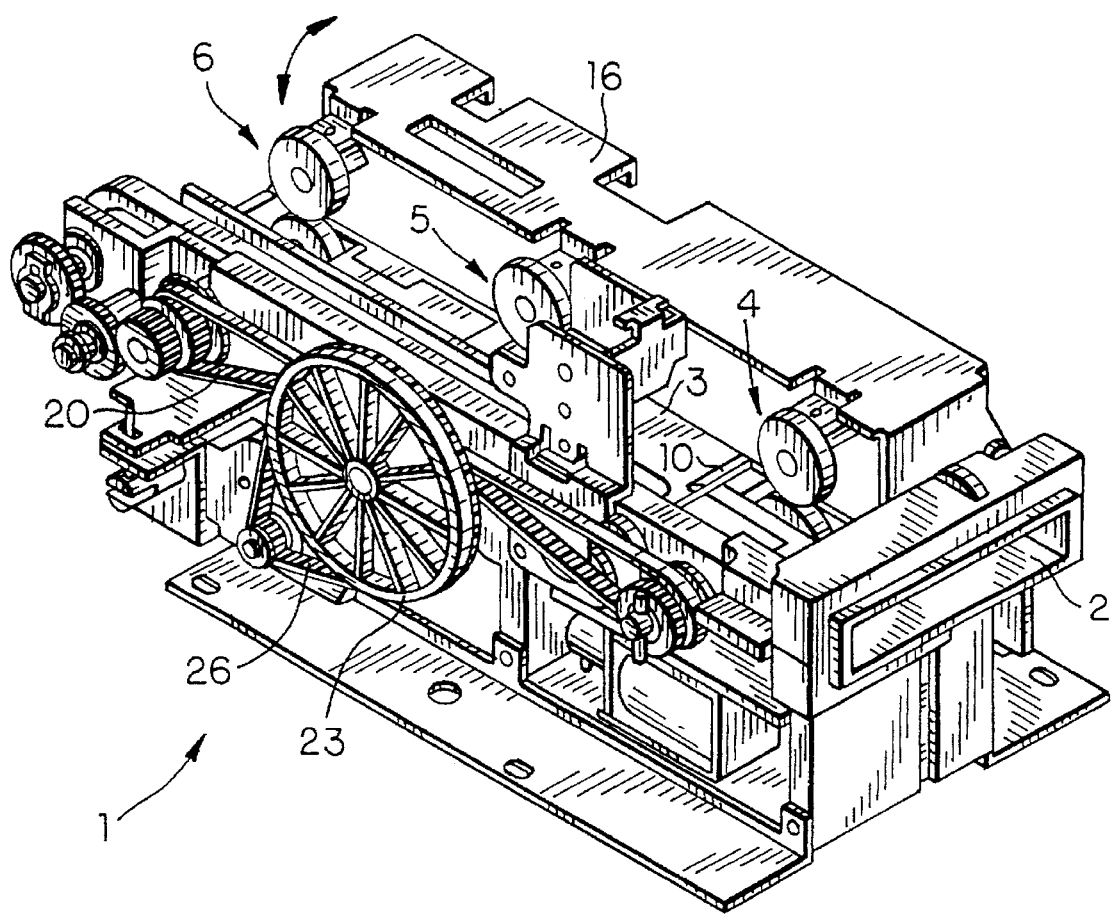
FIG. 1 is a perspective view of a card reader illustrating an embodiment of the present invention.
Figure 13:
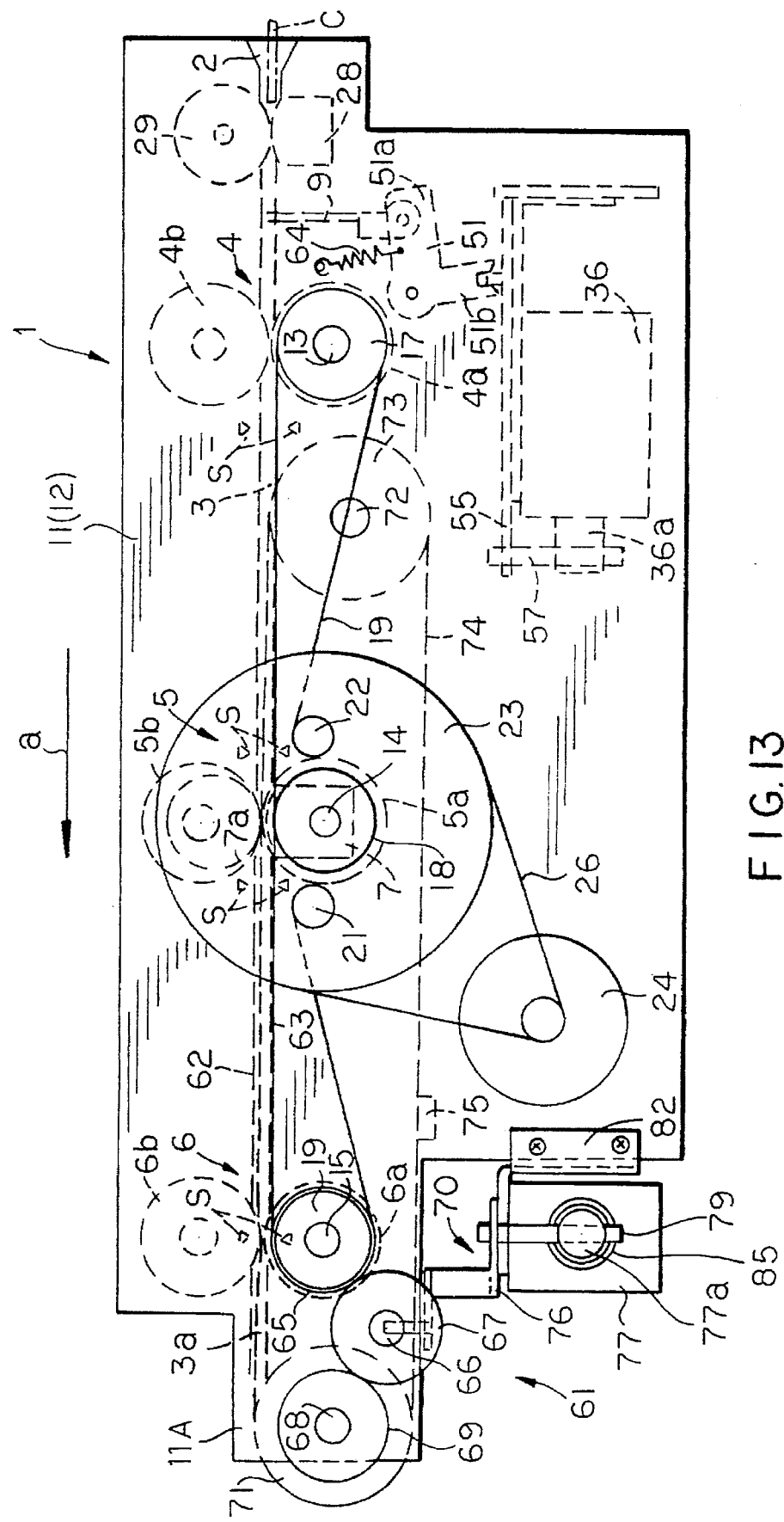
FIG. 13 is a side elevational view illustrating a schematic arrangement of the card reader equipped with a card ejecting mechanism in accordance with an embodiment of the present invention.

The card reader designated generally at reference numeral 1 in FIGS. 1 and 13 is equipped with a card ejecting mechanism 61 in accordance with the embodiment of the present invention. The card reader 1 processes magnetic information by taking the card C from the card insertion port 2 into the card traveling passage 3, the card C permitting the recording and reproduction of magnetic information. Here, the reciprocally traveling system is adopted in which the magnetic card C for which processing has been completed is discharged from the card insertion port 2.

The card C is provided with an unillustrated magnetic stripe extending in the longitudinal direction of a vinyl chloride-made card body on one side thereof. Magnetic information is recorded in the magnetic stripe, and the information is read by the magnetic head 7, or magnetic information is recorded or updated, as required.

The card reader 1 is provided with the following: the pairs of transport rollers 4, 5, and 6 for transporting the card C inserted into the card traveling passage 3 formed in such a manner as to extend from the card insertion port 2 in the card-advancing direction indicated by arrow a; the magnetic head 7 for magnetically processing the card C; the shutter 9 capable of moving into or away from the card traveling passage 3; and the card ejecting mechanism passage 61 for removing the card C jammed in the card traveling passage 3. The card traveling passage 3 is formed by having its left- and right-hand sides covered by the side plates 11 and 12 and its upper and lower sides covered by an upper guide plate 62 and a lower guide plate 63.

The pairs of transport rollers 4, 5, and 6 are arranged in order from the card insertion port 2 toward the farther end 3a of the card traveling passage 3, and are composed of the drive rollers 4a, 5a, and 6a and the driven rollers 4b, 5b, and 6b, respectively. Each of the drive rollers 4a, 5a, and 6a and each of the driven rollers 4b, 5b, and 6b are disposed in face-to-face relation to each other with the card traveling passage 3 located therebetween. The drive rollers 4a, 5a, and 6a are disposed below the card traveling passage 3, and are respectively fixed to the drive-side rotating shafts 13, 14, and 15 which are pivotally supported by the side plate 11. The driven rollers 4b, 5b, and 6b are supported above the card traveling passage 3, and the peripheral surfaces of the driven rollers 4b, 5b, and 6b are in contact with the peripheral surfaces of the drive rollers 4a, 5a, and 6a in the card traveling passage 3.

The pulleys 17, 18, and 19, around which the belt 20 is wound, are respectively fixed to the rotating shafts 13, 14, and 15 on the outer side of the slide plate 11. The rotatable rollers 21 and 22 are respectively disposed on both sides of the pulley 18 so as to impart tension to the belt 20 on both sides of the pulley 18. The drive pulley 23, around which the belt 26 adapted to be rotatively driven by the drive motor 24 is wound, is fixed to the rotating shaft 14.

When the card is taken in, the drive motor 24 rotates in such a manner as to rotatively drive the drive rollers 4a, 5a, and 6a counterclockwise, and is controlled by the unillustrated controlling means so as to rotate in the reverse direction to that during the taking-in operation after the operation of reading or recording the card C by the magnetic head 7. Also, the drive motor 24 is adapted to stop if the card C is placed in the card traveling passage 3 in an inserted state for a predetermined time or more. A plurality of optical card sensors S provided along the card traveling passage 3 are used to detect this predetermined time. Unless the card C passes each section between adjacent ones of the sensors S in a predetermined time which is set by the unillustrated controlling means, the sensors issue a card jam signal, and a driving means of the card ejecting mechanism 61 which will be described later is driven.

The magnetic head 7 is located above the axis of the drive roller 5a, and its head surface 7a is made to slightly project into the card traveling passage 3. The magnetic head 7 is disposed in face-to-face relation to the magnetic stripe with the card traveling passage 3 located therebetween. At an upper position opposing the magnetic head 7, the pad roller 27 is disposed in face-to-face relation to the head. Either one of the magnetic head 7 and the pad roller 27 is urged toward the other, so as to allow the two members to nip the card C being transported with a fixed pressing force (pad pressure). Here, the magnetic head 7 is urged toward the pad roller 27 by the unillustrated spring member.

The prehead 28 for detecting the type of card on the basis of the presence or absence of a magnetic signal from the card C is provided in the vicinity of the insertion port 2 in such a manner as to project slightly into the card traveling passage 3 from below. The prehead 28 is formed by a magnetic head, and, here, it constitutes a part of a trigger for controlling the starting of the drive motor 24 and the opening and closing operation of the shutter 9. The rotatable pad roller 29 is disposed above the prehead 28 in face-to-face relation thereto.

The shutter 9 is disposed in the vicinity of the card insertion port 2, and is supported by one set of ends 51a of a pair of L-shaped levers 51 supported swingably by the side plates 11 and 12, respectively. The levers 51 are urged in the direction in which the shutter 9 is made to project into the card traveling passage 3 by means of a coil spring 64. The other ends of the levers 51 are engaged with a portion of the slidable slide plate 55 connected to a movable piece 36a of the electromagnetic solenoid 36 by means of the pin 57. When the electromagnetic solenoid 36 is driven, the slide plate 55 swings the levers 51 clockwise to move the shutter 9 in the direction in which the shutter 9 retreats from the card traveling passage 3. As the electromagnetic solenoid 36, a push-type electromagnetic solenoid is used in which the electromagnetic solenoid 36 normally has its movable piece 36a positioned in such a way as to cause the shutter 9 to advance into the card traveling passage 3, and the electromagnetic solenoid 36 pushes out the movable piece 36a when a drive signal from the prehead 28 is supplied to the electromagnetic solenoid 36.

Next, a description will be given of the card ejecting mechanism 61. The card ejecting mechanism 61 is composed of the following: a drive gear 65 secured to the drive shaft 15; a clutch gear 67 provided on a support shaft 66 supported by an extended plate 11A of the side plate 11 which forms a base portion of the card reader 1; an ejecting gear 69 fixed to a pivotal shaft 68 supported by the extended plate 11A; a driving means 70 for causing the clutch gear 67 to engage with or disengage from the ejecting gear 69; and an engaging projection 75 serving as an ejecting member provided on a chain 74 which is trained between a first sprocket 71 provided on the pivotal shaft 68 and a second sprocket 73 provided on a pivotal shaft 72 disposed between the pairs of transport rollers 4 and 5. The driving means 70 has a moving plate 76 engaged with the support shaft 66 and an electromagnetic solenoid 77 serving as a plunger for sliding the moving plate 76.

Figure 14:
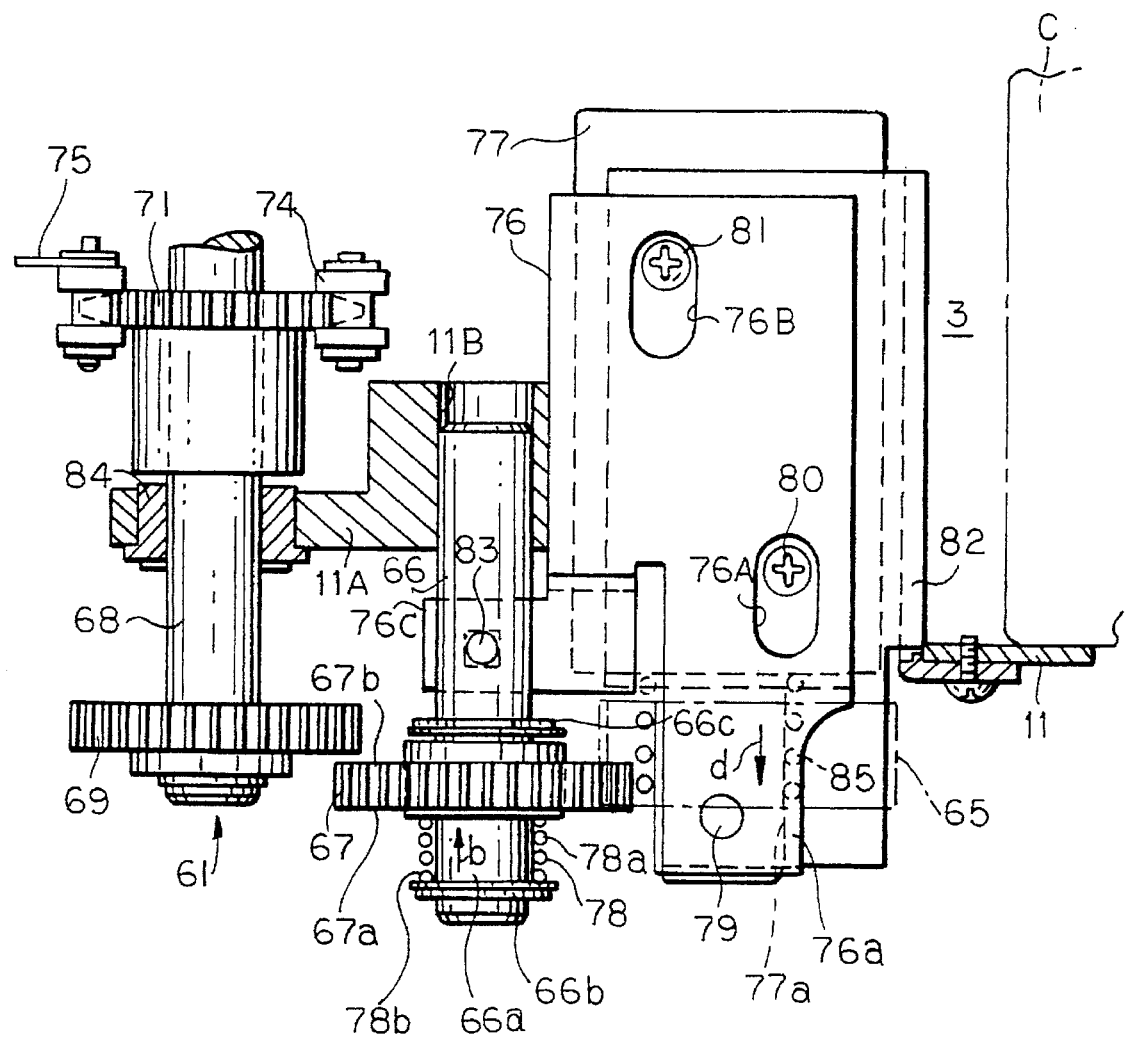
FIG. 14 is a plan view, partially broken away, of the arrangement of the card ejecting mechanism.

The drive gear 65 is fixed to the drive shaft 15 on the outer side of the side plate 11, and has a width wider than the width of the clutch gear 67 in the axial direction, as shown in FIG. 14. The support shaft 66 is slidably supported in a through hole 11B formed in the extended plate 11A. Stopper rings 66b and 66c are provided with an interval therebetween on a distal end 66a side of this shaft.

The clutch gear 67 is slidably provided on the support shaft 66 between the stopper rings 66b and 66c. A torsion coil spring 78 is provided between an outer end face 67a of the clutch gear 67 and the stopper ring 66b. One end 78a of the torsion coil spring is retained at the outer end face 67a, and another end 78b thereof is retained at the stopper ring 66b, so as to urge the clutch gear 67 in the direction in which the clutch gear 67 meshes with the ejecting gear 69. The clutch gear 67 constantly meshes with the drive gear 65.

Figure 16:
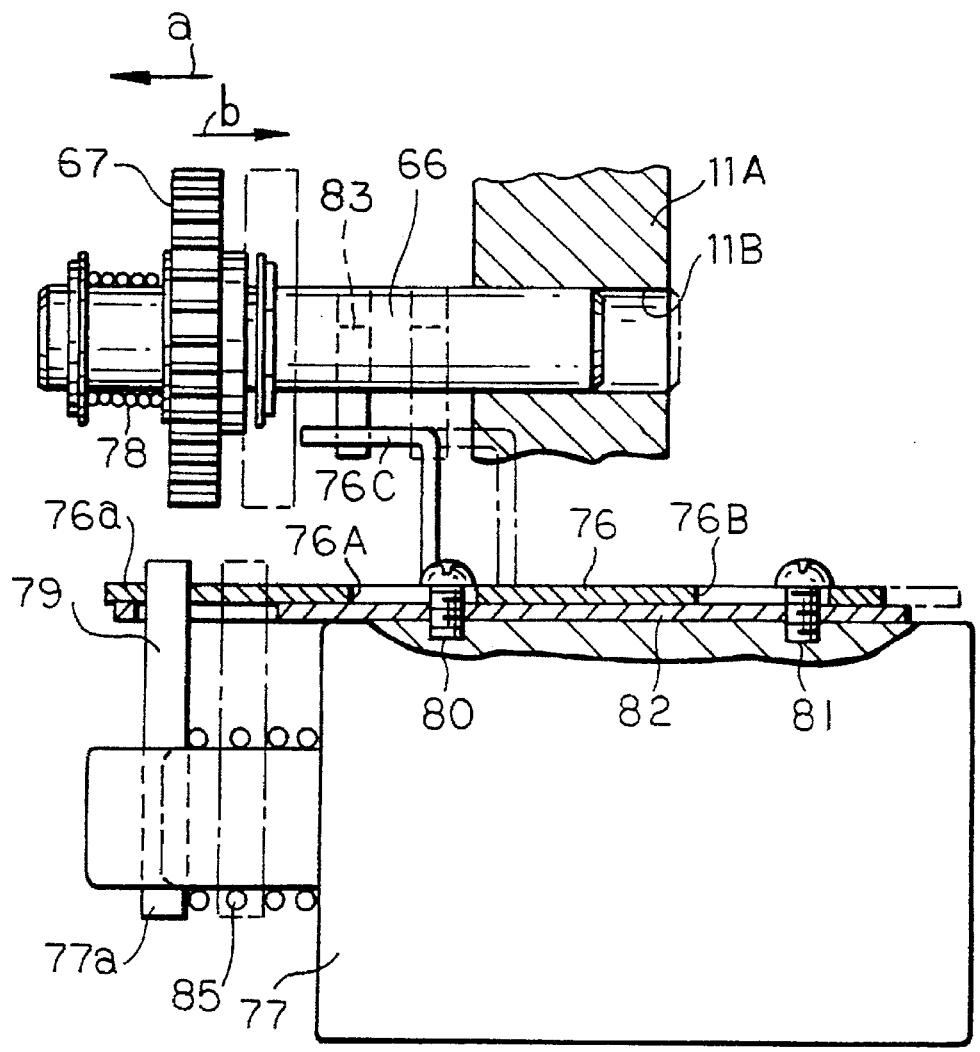
FIG. 16 is a front elevational view, partially broken away, of the arrangement and operation of the card ejecting mechanism.

The moving plate 76 is disposed on a bracket 82 for supporting the electromagnetic solenoid 77 and is formed so as to extend in the axial direction of the support shaft 66, and its distal end 76a is connected to a movable rod 77a of the electromagnetic solenoid 77 by means of a pin 79. Elongated holes 76A and 76B are formed in the moving plate 76 so as to extend in its longitudinal direction. Screws 80 and 81 for tightening the electromagnetic solenoid 77 to the bracket 82 are respectively passed through and fitted loosely in the elongated holes 76A and 76B, so as to make the moving plate 76 slidable on the bracket 82. An arm portion 76C, which engages the support shaft 66 by a pin 83, is formed on an intermediate portion of the moving plate 76 so as to extend upwardly in a bent form, as shown in FIG. 16.

The electromagnetic solenoid 77 is driven when the card C is jammed in the card traveling passage 3. Here, when the card jamming is detected by the card sensors S, the electromagnetic solenoid 77 is energized and driven. The electromagnetic solenoid 77 is normally urged to its initial position indicated by the solid lines in FIG. 16 by a coil spring 85 wound around the movable rod 77a between the pin 79 and its main body. As the electromagnetic solenoid 77, a pull-type electromagnetic solenoid is used which, when energized, pulls the movable rod 77a to the position indicated by the two-dotted dash lines, so as to slide the movable plate 76 in the direction in which the clutch gear 67 and the ejecting gear 69 mesh, as shown by the arrow b.

Figure 15:
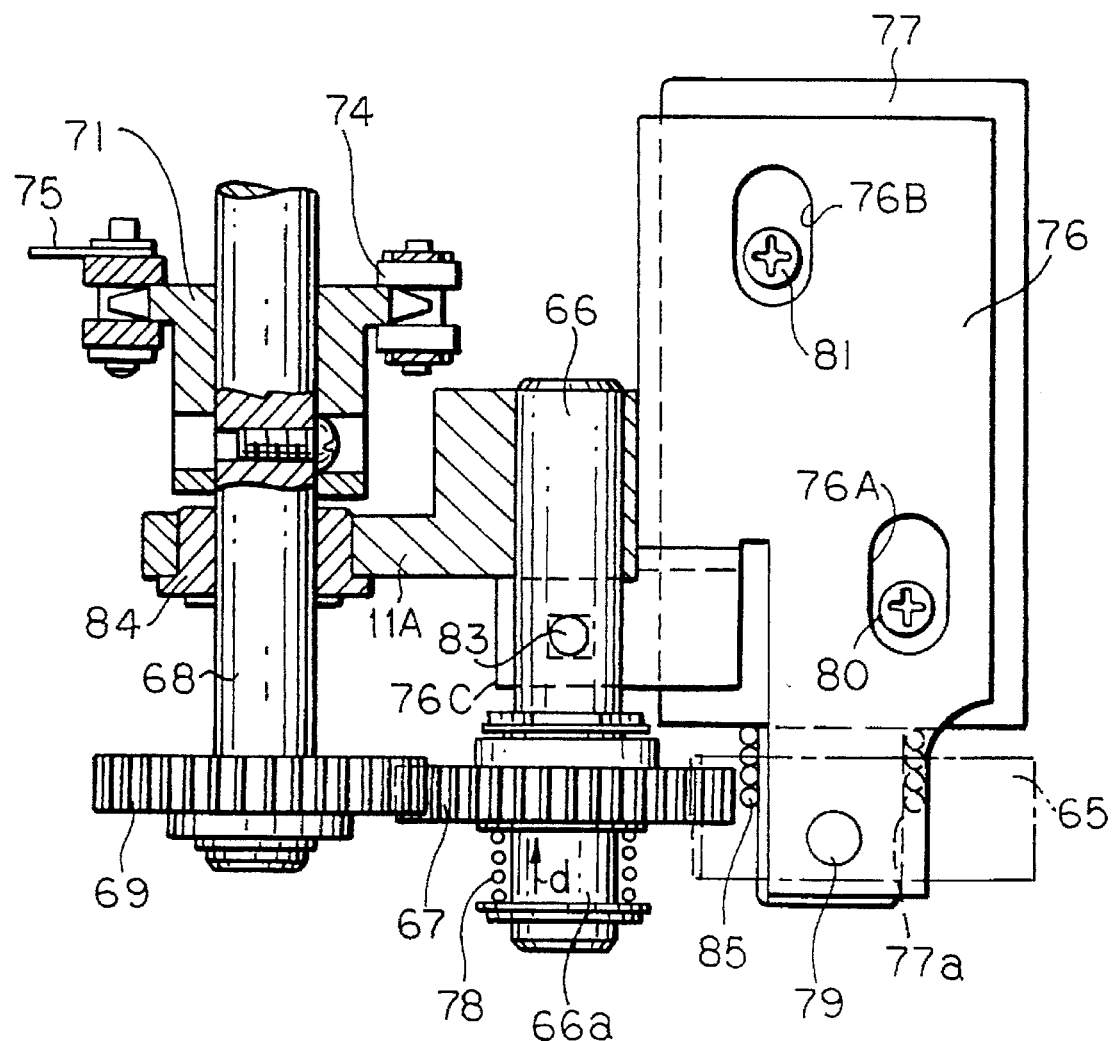
FIG. 15 is a plan view, partially broken away, of a state of operation of the card ejecting mechanism.

As shown in FIGS. 14 and 15, the ejecting gear 69 is rotatably supported by the extended plate 11A and the unillustrated side plate by means of a bearing 84, and is fixed to the pivotal shaft 68. The ejecting gear 69 is disposed in the range of movement (displacement) of the clutch gear 67, and is normally spaced apart from the clutch gear 67.

Figure 17:
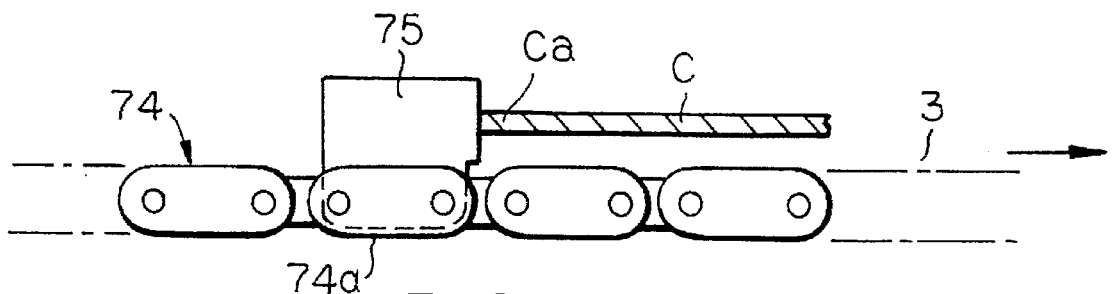
FIG. 17 is a side elevational view illustrating a state in which the card is ejected by an ejecting member.

The first sprocket 71 is fixed to the pivotal shaft 68 located inwardly of the extended plate 11A, and is disposed below the card traveling passage 3 in parallel with the second sprocket 73 shown in FIG. 13. The chain 74 is trained between the first and second sprockets 71 and 73 in parallel with the card traveling passage 3, so as to allow the engaging projection 75 to advance into the card traveling passage 3. As shown in FIG. 17, the engaging projection 75 is formed with a thickness which extends in the vertical direction with respect to the card passage and is greater than the thickness of the card. The engaging projection 75 is fixed to one of the links 74a constituting the chain 74. The engaging projection 75 is normally placed at a position removed from the card traveling passage 3, as shown in FIG. 1. Here, although the engaging projection 75 is provided on only one link 74a, engaging projections may be provided on adjacent links, respectively.

A description will be given of the operation of the card reader 1 and the card ejecting mechanism 61 arranged as described above. When the card C is inserted into the card insertion port 2, and a magnetic signal from the unillustrated magnetic stripe is detected by the prehead 28, the electromagnetic solenoid 36 is energized to retreat the shutter shown in FIG. 13 from the card traveling passage 3, thereby allowing the card C to be inserted into the card traveling passage 3. The signal detected by the prehead 28 starts the drive motor 24 to rotatively drive the belt 26 counterclockwise. This rotation is transmitted to the rotating shafts 13, 14, and 15 by means of the pulley 18 and the belt 20 to drive the pairs of transport rollers 4, 5, and 6, thereby taking in and transporting the card C. At this time, the clutch gear 67 which is in a state of meshing with the drive gear 65 is set in a rotatively driven state.

When the taken-in card C passes over the shutter 9, the energization of the electromagnetic solenoid 36 is stopped, and the shutter 9 is raised by the spring force of the coil spring 64, thereby closing the card traveling passage 3.

The card C taken into the card traveling passage 3 is subjected to a series of magnetic information processing such as the reading, recording/updating, confirmation (verification), and the like of magnetic information with respect to the magnetic stripe by the magnetic head 7. When this processing is completed, the card C is transported toward the card insertion port 2 as the drive motor 24 is reversely rotated. Upon completion of the processing of the card C, the electromagnetic solenoid 36 is energized to retreat the shutter 9 from the card traveling passage 3 and to open the card traveling passage 3, so that the card C being transported toward the card insertion port 2 is discharged from the insertion port 2.

Meanwhile, when the card C taken into the card traveling passage 3 stays in the card traveling passage 3 for a predetermined time or more, or the traveling speed in the card traveling passage 3 is appreciably delayed, the card sensors S disposed in the card traveling passage 3 detect that the card is jammed. As a result, the drive motor 24 is temporarily stopped, and the electromagnetic solenoid 77 is driven to move the movable rod 77a from the solid-line position shown in FIG. 16 in the direction of arrow b. Then, since the moving plate 76 slides in the direction of arrow b, the support shaft 66 connected thereto by means of the pin 83 slides in the through hole 11B while compressing the coil spring 78 by the stopper ring 66b, and moves to the position indicated by the two-dotted dash lines. As the support shaft 66 thus slides, the clutch gear 67 is displaced to the position in which the clutch gear 67 meshes with the ejecting gear 69, and is resiliently brought into contact with the gear by the spring force of the coil spring 78.

When the electromagnetic solenoid 77 is driven, the drive motor 24 is driven again, so that the clutch gear 67 also rotates together with the drive gear 65. Since the clutch gear 67 is urged toward the ejecting gear 69 by the coil spring 78, when the drive gear 65 rotates with the clutch gear 67 abutting against the ejecting gear 69, and the teeth of the clutch gear 67 are offset from the teeth of the ejecting gear 69 (i.e., offset by a one-tooth portion), the clutch gear 67 is pushed into engagement with the ejecting gear 69. At this time, if the teeth of the ejecting gear 69 and the clutch gear 67 are in a proper meshing relationship, the two gears mesh with each other even if the clutch gear 67 is not rotated.

Subsequently, the rotation of the drive gear 65 is transmitted to the ejecting gear 69 via the clutch gear 67, thereby rotating the first sprocket 71. Then, since the chain 74 rotates, the engaging projection 75 advances into the card traveling passage 3, and abuts against the jammed card C, as shown in FIG. 17, and catches and transports the card in the card traveling passage 3.

Since the card reader 1 in this embodiment is arranged to discharge the card C from the card insertion port 2, the engaging projection 75 is moved in the direction in which the engaging projection 75 abuts against the leading end Ca of the jammed card C, and the card C is transported toward the insertion port 2, thereby forcefully ejecting the card C from the card traveling passage 3. Meanwhile, in a case where the card C is jammed in the card reader of the reciprocally traveling system in which the card is ejected from the farther end 3a side of the card traveling passage 3, the drive motor 24 is driven again in the direction in which the card was being transported, and the card is discharged. Accordingly, in a case where the card is jammed in the course of its movement in the card-advancing direction, the card is discharged from the farther end 3a side of the card traveling passage 3, while in a case where the card is jammed while the card was moving toward the card insertion port, the card is discharged from the card insertion port 2.

Meanwhile, if the card C is returned to the card insertion port 2, the driving of the drive motor 24 is stopped, and the energization of the electromagnetic solenoid 77 is stopped. Consequently, the moving plate 76 moves in the direction of arrow d shown in FIG. 16 by means of the spring force of the coil spring 85 wound around the movable rod 77a. Hence, the support shaft formed integrally with the moving plate 76 by means of the pin 83 slides, thereby disengaging the clutch gear 67 from the ejecting gear 69.

Thus, the ejecting gear 69 for driving the engaging projection 75 for abutting against the jammed card C is coupled by means of the clutch gear 67 to the drive gear 65 which is driven by the drive motor 24, so that the ejecting gear 69 can be driven by the drive motor 24. Therefore, the jammed card C can be ejected by a single motor.

In addition, since the ejecting gear 69 is coupled to the drive gear 65 by means of the clutch gear 67, the ejecting gear 69 is rotatively driven in the same direction as the drive gear 65. As a result, the transporting and driving force of the pairs of transport rollers 4, 5, and 6, together with the moving force of the engaging projection 75, supplementally acts on the jammed card, so that the jammed card C can be transported reliably in the discharging direction.

Furthermore, since the coil spring 78 is wound around the support shaft 66 to urge the clutch gear 67 toward the ejecting gear 69, the two gears can be positively set in a meshing state as the clutch gear 67 is only rotated slightly. Consequently, it is possible to prevent the chipping of teeth caused by unnecessary rotation.

It should be noted that although, in this embodiment, the electromagnetic solenoid 77 is used as a plunger for the driving means 70, an electromagnetic clutch, a rotary solenoid, or the like may, of course, be used instead.

In accordance with the present invention, since the ejecting gear for driving the ejecting member is coupled by means of the clutch gear to the drive gear which is driven by the drive motor, the ejecting gear can be driven by the single drive motor so as to forcefully eject the card jammed in the card traveling passage.

In addition, since the ejecting gear is rotatively driven in the same direction as the drive gear by means of the clutch gear, the transporting and driving force of the pairs of transport rollers, together with the moving force of the ejecting member, can supplementally act on the jammed card, so that the jammed card can be transported reliably in the discharging direction, thereby leading to improvement of the reliability of the card reader.

While the foregoing description and drawings represent the preferred embodiments of the present invention, it will be obvious to those skilled in the art that various changes and modifications may be made therein without departing from the true spirit and scope of the present invention.

What is claimed is:

1. A card reader comprising:

a pad-roller supporting mechanism including:

a pad roller block for supporting a plurality of pad rollers for transporting a card inserted into a card traveling passage in cooperation with a plurality of drive rollers supported by a main-body block, said pad roller block being pivotally supported by said main-body block about pivotal shafts provided in parallel with the card traveling passage so as to be openable and capable of causing each of said pad rollers to come into contact with and move away from each of said drive rollers;

a spring member having a spring force for imparting to said pad roller block a rotating urging force in a closing direction in which said pad rollers approach said drive rollers; and a pressing plate supported by said pad roller block and said spring member between an operating region and a nonoperating region of said spring member so as to be capable of being engaged with or disengaged from said pad roller block and said spring member, said rotating urging force being cancelled when the pressing plate occupies the non-operating region.

2. A card reader according to claim 1, wherein an L-shaped guide groove ranging over the operating region and the nonoperating region of said spring member is provided in said pad roller block, and a projection for engaging and being guided in said L-shaped guide groove is formed on said pressing plate, for allowing said pressing plate to be displaceable between the operating region and the nonoperating region of said spring member.

3. A pad-roller supporting mechanism according to claim 1 comprising:

a pad roller block for supporting a plurality of pad rollers for transporting a card inserted into a card traveling passage in cooperation with a plurality of drive rollers supported by a main-body block, said pad roller block being pivotally supported by said main-body block about pivotal shafts provided in parallel with the card traveling passage so as to be openable and capable of causing each of said pad rollers to come into contact with and move away from each of said drive rollers; and a card traveling reference plane provided on one side of the card traveling passage, said card slidably travelling along said card traveling reference plane by pressing and urging said card by a pressing member;

wherein said pivotal shafts of said pad roller block are provided on an outer side of the card traveling reference plane.

4. A card reader according to claim 1, further comprising:

a plurality of transport rollers provided arranged to project slightly into the card traveling passage which is formed so as to extend from a card insertion port in a card-advancing direction, for transporting the card inserted into the card traveling passage;

an IC contact disposed between a first pair of transport rollers provided in a vicinity of the card traveling passage and a second pair of transport rollers disposed next to said first pair of transport rollers among said three pairs of transport rollers;

a magnetic head for recording and reproducing magnetic information with respect to the card; and a shutter disposed between the card traveling passage and said first pair of transport rollers and capable of moving into and away from the card traveling passage.

5. A card reader according to claim 4, further comprising:

a support member for supporting rollers located above said card traveling passage of said transport rollers and said IC contact, said support disposed on a traveling reference plane side of the card traveling passage.

6. A card reader according to claim 1, wherein said magnetic head is disposed above an axis of said drive roller constituting one of the rollers of said second pair of transport rollers.

7. A card reader according to claim 4, wherein an interval between said second pair of transport rollers and said shutter is set to be longer than a length of the card, and an interval between said first pair of transport rollers and the card insertion port is set to be shorter than the length of the card by at least 30 mm.

8. A card reader according to claim 1, further comprising:

a card ejecting mechanism including:

a drive gear secured to said drive shaft;

a clutch gear provided on a support shaft supported slidably by a base portion of said card reader so as to mesh with said drive gear;

an ejecting gear provided on a pivotal shaft supported by the base portion of said card reader;

driving means for displacing and moving said clutch gear in a direction in which said clutch gear meshes with said ejecting gear; and an ejecting member provided on said pivotal shaft and adapted to be introduced into the card traveling passage by intermeshing with said clutch gear and said ejecting gear.

9. A card reader comprising:

a main body block supporting a plurality of drive rollers;

a pad roller supporting mechanism having a pad roller block for supporting a plurality of pad rollers, said pad rollers and said drive rollers for transporting a card inserted into a card traveling passage;

a pivotal shaft having a longitudinal axis, said pivotal shaft being positioned so said longitudinal axis is parallel to the card traveling passage, said pivotal shaft for allowing a pivoting motion of said pad roller supporting mechanism between an open position and a closed position relative to said main body block, said closed position being occupied when said pad rollers approach said drive rollers;

a pressing plate moveable between operating and non-operating positions relative to said pad roller supporting mechanism and said main body block; and, a spring member disposed between said main body block and said pressing plate to impart a rotating urging force to said pad roller supporting mechanism toward said closed position when said pressing plate occupies said operating position.

* * * * *